United States Patent
Wakabayashi et al.

(10) Patent No.: US 10,266,712 B2
(45) Date of Patent: Apr. 23, 2019

(54) INK-JET PRINTING WITH WATER-BASED INK ON RECORDING MEDIUM HAVE LOW WATER-ABSORPTION

(71) Applicant: KAO CORPORATION, Tokyo (JP)

(72) Inventors: Yuki Wakabayashi, Izumiotsu (JP); Kaname Mitsuyoshi, Wakayama (JP); Hirotaka Takeno, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 15/504,948

(22) PCT Filed: Aug. 18, 2015

(86) PCT No.: PCT/JP2015/073113
§ 371 (c)(1),
(2) Date: Feb. 17, 2017

(87) PCT Pub. No.: WO2016/027801
PCT Pub. Date: Feb. 25, 2016

(65) Prior Publication Data
US 2017/0267885 A1    Sep. 21, 2017

(30) Foreign Application Priority Data

Aug. 20, 2014 (JP) .................................. 2014-167613

(51) Int. Cl.
| | |
|---|---|
| *B41J 2/01* | (2006.01) |
| *B41M 5/00* | (2006.01) |
| *C09C 1/00* | (2006.01) |
| *C09D 11/30* | (2014.01) |
| *C09D 11/107* | (2014.01) |
| *C09D 11/322* | (2014.01) |

(52) U.S. Cl.
CPC ............... *C09D 11/322* (2013.01); *B41J 2/01* (2013.01); *B41M 5/0023* (2013.01); *B41M 5/0047* (2013.01); *B41M 5/0064* (2013.01); *C09C 1/00* (2013.01); *C09D 11/107* (2013.01); *C09D 11/30* (2013.01)

(58) Field of Classification Search
CPC ......... C09D 11/322; C09D 11/107; B41J 2/01
See application file for complete search history.

(56) References Cited

U.S. PATENT DOCUMENTS

| | | |
|---|---|---|
| 5,641,346 A | 6/1997 | Mantell et al. |
| 6,110,266 A | 8/2000 | Gonzalez-Blanco et al. |
| 9,388,321 B2 | 7/2016 | Mizushima et al. |
| 2004/0092623 A1 | 5/2004 | Hesler et al. |
| 2006/0173096 A1 | 8/2006 | Ota |
| 2007/0037901 A1 | 2/2007 | Kanaya et al. |
| 2009/0068359 A1 | 3/2009 | Doi et al. |
| 2010/0076134 A1 | 3/2010 | Yoshida |
| 2010/0086689 A1 | 4/2010 | Ohta |
| 2010/0086691 A1 | 4/2010 | Mukai et al. |
| 2010/0087595 A1 | 4/2010 | Koganehira et al. |
| 2010/0245416 A1 | 9/2010 | Ohshima et al. |
| 2011/0043578 A1 | 2/2011 | Tojo |
| 2014/0002539 A1* | 1/2014 | Goto ..................... C09D 11/322 347/20 |
| 2015/0035896 A1* | 2/2015 | Gotou .................. B41J 11/0015 347/20 |
| 2016/0115329 A1* | 4/2016 | Ohmoto ................. C09D 11/10 428/195.1 |

FOREIGN PATENT DOCUMENTS

| | | |
|---|---|---|
| EP | 3 088 481 A1 | 11/2016 |
| JP | 10-53741 A | 2/1998 |
| JP | 2003-105234 A | 4/2003 |
| JP | 2004-176057 A | 6/2004 |
| JP | 2005-36202 A | 2/2005 |
| JP | 2007-51176 A | 3/2007 |
| JP | 2008-101192 A | 5/2008 |
| JP | 2008-260279 A | 10/2008 |
| JP | 2010-18774 A | 1/2010 |
| JP | 2012-31246 A | 2/2012 |

(Continued)

OTHER PUBLICATIONS

Extended European Search Report, dated Feb. 22, 2018, for European Application No. 15833498.7.
International Search Report (form PCT/ISA/210), dated Mar. 20, 2014, for International Application No. PCT/JP2013/083538.
Written Opinion of the International Searching Authority and International Search Report (forms PCT/ISA/237 and PCT/ISA/210), dated Oct. 20, 2015, for International Application No. PCT/JP2015/073113.

*Primary Examiner* — Bradley W Thies
(74) *Attorney, Agent, or Firm* — Birch, Stewart, Kolasch & Birch, LLP

(57) ABSTRACT

The present invention provides an ink-jet printing method using a water-based ink for ink-jet printing which is excellent in quick-drying fixing properties and long-term fixing properties when printing characters or images on a low-water absorbing recording medium, as well as ejection stability. The present invention relates to [1] an ink-jet printing method of printing characters or images on a recording medium using a water-based ink for ink-jet printing, in which the recording medium has a water absorption of not more than 10 g/m$^2$ and not less than 0 g/m$^2$ as measured in a pure water contact time of 100 milliseconds; the water-based ink includes a pigment (A), resin particles (B), a polypropylene glycol (X) and water; and the resin particles (B) are produced by emulsion polymerization method; and [2] the aforementioned water-based ink for ink-jet printing.

17 Claims, No Drawings

(56) References Cited

FOREIGN PATENT DOCUMENTS

| | | |
|---|---|---|
| JP | 2013-216864 A | 10/2013 |
| JP | 2014-139298 A | 7/2014 |
| JP | 2015-124223 A | 7/2015 |
| WO | WO 2010/038457 A1 | 4/2010 |

\* cited by examiner

INK-JET PRINTING WITH WATER-BASED INK ON RECORDING MEDIUM HAVE LOW WATER-ABSORPTION

FIELD OF THE INVENTION

The present invention relates to an ink-jet printing method and a water-based ink for ink-jet printing.

BACKGROUND OF THE INVENTION

In ink-jet printing methods, droplets of ink are directly projected onto a recording medium from very fine nozzles and allowed to adhere to the recording medium to form characters or images. The ink-jet printing methods have become rapidly spread because of various advantages such as easiness of full coloration, low cost, capability of using a plain paper as the recording medium, non-contact with printed characters or images, etc.

In recent years, in order to impart good weathering resistance and good water resistance to printed materials, an ink containing a pigment as a colorant has been extensively used.

On the other hand, it has been required to print characters or images on a recording medium for commercial printing purposes using a low-water absorbing coated paper such as an offset coated paper, or a non-water absorbing resin film such as a polyvinyl chloride resin film, a polypropylene resin film and a polyester resin film.

It is known that when characters or images are printed on the low-water absorbing or non-water absorbing recording medium by the ink-jet printing methods, there tend to occur problems such as prolonged drying time owing to slow absorption or no absorption of liquid components, and deterioration in quick-drying fixing properties of the ink upon printing the characters or images thereon. Furthermore, it is also known that when printing characters or images on such a low-water absorbing recording medium, the pigment as a colorant of the ink tends to remain on a surface layer of the recording medium, thereby causing deterioration in long-term fixing properties of the ink.

In order to improve fixing properties of the ink on the low-water absorbing or non-water absorbing recording medium, various studies for incorporating resin particles into the ink have been made conventionally. For example, in JP 2004-176057A, it is described that by incorporating resin particles having a specific Tg value into an ink, it is possible to achieve improvement in fixing properties of a colorant in the ink on a hydrophobic non-water absorbing recording medium. In Examples of JP 2004-176057A, it is also described that N-methyl pyrrolidone, polyethylene glycol, ethylene glycol, glycerol, 2-pyrrole, 1,2,6-hexanetriol or the like is used as an organic solvent for the ink. In addition, JP 2013-216864A discloses an aqueous ink-jet ink including water, a pigment, water-dispersible resin particles as a binder resin, and two or more kinds of specific water-soluble organic solvents, which is excellent in printability to a highly-hydrophobic less-absorptive base material such as a coated paper, an art paper and a polyvinyl chloride sheet, ejection stability through ink-jet nozzles, storage stability and coating film durability. In addition, in JP 2013-216864A, it is also described that (poly)propylene glycol alkyl ethers and alkane diols are used as the aforementioned water-soluble organic solvents.

SUMMARY OF THE INVENTION

The present invention relates to the following aspects [1] and [2].

[1] An ink-jet printing method of printing characters or images on a recording medium using a water-based ink for ink-jet printing, in which the recording medium has a water absorption of not more than 10 $g/m^2$ and not less than 0 $g/m^2$ as measured in a pure water contact time of 100 milliseconds;

the water-based ink includes a pigment (A), resin particles (B), a polypropylene glycol (X) and water; and the resin particles (B) are produced by emulsion polymerization method.

[2] A water-based ink for ink-jet printing including a pigment (A), resin particles (B), a polypropylene glycol (X) and water, in which the resin particles (B) are produced by emulsion polymerization method.

DETAILED DESCRIPTION OF THE INVENTION

In the case where the resin particles are merely compounded into the ink in order to improve fixing properties of the ink on the low-water absorbing recording medium as described in the aforementioned conventional arts, there tends to occur such a problem that if a certain period of time is elapsed while keeping the ink non-ejected from ink-jet nozzles after ejecting the ink through the ink-jet nozzles to print characters or images on the recording medium, the resin particles tend to be aggregated in the nozzles, and the ink tend to suffer from ejection defects upon ejecting the ink again through the nozzles. Also, the "ejection stability" as described in JP 2013-216864A is evaluated by nozzle omission, i.e., no ejection of the ink through nozzles, when subjecting the ink to printing operations for 30 minutes by ejecting the ink through the nozzles, and therefore is different in evaluation method from such an ejection stability as described in the aforementioned problem to be solved by the present invention.

The present invention aims at providing a water-based ink for ink-jet printing which is excellent in quick-drying fixing properties and long-term fixing properties when printing characters or images on a low-water absorbing recording medium, as well as ejection stability after a certain period of time is elapsed while keeping the ink non-ejected from ink-jet nozzles (hereinafter also referred to merely as "ejection stability"), and an ink-jet printing method of printing characters or images on a low-water absorbing recording medium using the water-based ink.

Meanwhile, the term "low water absorption" as used in the present invention is intended to mean both concepts of low water absorption and non-water absorption.

The present inventors have found that by incorporating a polypropylene glycol into a water-based ink containing resin particles produced by emulsion polymerization method, it is possible to produce a water-based ink for ink-jet printing which is excellent in quick-drying fixing properties and long-term fixing properties when printing characters or images on a low-water absorbing recording medium, as well as ejection stability after a certain period of time is elapsed while keeping the ink non-ejected from ink-jet nozzles, and attain an ink-jet printing method of printing characters or images on a low-water absorbing recording medium using the water-based ink.

That is, the present invention relates to the following aspects [1] and [2].

[1] An ink-jet printing method of printing characters or images on a recording medium using a water-based ink for ink-jet printing, in which the recording medium has a water absorption of not more than 10 g/m² and not less than 0 g/m² as measured in a pure water contact time of 100 milliseconds;

the water-based ink includes a pigment (A), resin particles (B), a polypropylene glycol (X) and water; and the resin particles (B) are produced by emulsion polymerization method.

[2] A water-based ink for ink-jet printing including a pigment (A), resin particles (B), a polypropylene glycol (X) and water, in which the resin particles (B) are produced by emulsion polymerization method.

In accordance with the present invention, there are provided a water-based ink for ink-jet printing which is excellent in quick-drying fixing properties and long-term fixing properties when printing characters or images on a low-water absorbing recording medium, as well as ejection stability, and an ink-jet printing method of printing characters or images on a low-water absorbing recording medium using the water-based ink.

[Water-Based Ink for Ink-Jet Printing]

The water-based ink for ink-jet printing according to the present invention (hereinafter also referred to merely as a "water-based ink" or an "ink") includes a pigment (A), resin particles (B), a polypropylene glycol (X) and water, in which the resin particles (B) are produced by emulsion polymerization method.

Meanwhile, the term "water-based" as used herein means that water has a largest content among whole components in a dispersing medium contained in the ink.

The water-based ink for ink-jet printing according to the present invention has the effect of exhibiting excellent quick-drying fixing properties and long-term fixing properties when printing characters or images on a low-water absorbing recording medium, as well as excellent ejection stability. The reason why the aforementioned advantageous effect can be attained by the present invention is considered as follows though it is not clearly determined.

That is, in the method for producing the resin particles (B) by emulsion polymerization, it is possible to obtain resin particles having a high molecular weight as compared to the other polymerization methods such as solvent polymerization. It is considered that the water-based ink into which the high-molecular weight resin particles (B) produced by emulsion polymerization are incorporated can form a highly-tough film on a surface of the low-water absorbing recoding medium and can be therefore improved in long-term fixing properties. Furthermore, it is considered that the resin particles (B) are likely to undergo phase separation owing to a high molecular weight thereof, and the solvent is hardly captured into the film formed on the surface of the low-water absorbing recoding medium and therefore can be dried without any disturbance, so that the ink can be improved in quick-drying fixing properties.

However, since the water-based ink remaining within an ink-jet print head after conducting the ink-jet printing is concentrated by evaporation of water therefrom with the passage of time, the resin particles (B) produced by emulsion polymerization are interacted with each other to produce an association product of the particles in meniscus portions of the print head. It is considered that the energy for ejecting the ink (ejection energy) is adversely affected by formation of the association product, and therefore inhibited from efficiently propagating to the ink, thereby causing deterioration in ejection stability of the ink.

In the present invention, it is considered that the polypropylene glycol (X) contained in the water-based ink enters between the resin particles in the association product and exhibits a plasticizing effect of reducing an association force between the particles in the association product, so that the ejection energy can efficiently propagate to the ink without any disturbance, whereby the ink can be improved in ejection stability.

<Water-Based Ink for Ink-Jet Printing>

The water-based ink for ink-jet printing used in the present invention includes a pigment (A) (hereinafter also referred to merely as a "component (A)"), resin particles (B) (hereinafter also referred to merely as "resin particles" or a "component (B)"), a polypropylene glycol (X) (hereinafter also referred to merely as a "component (X)") and water, in which the resin particles (B) are produced by emulsion polymerization method.

<Pigment (A)>

From the viewpoint of improving water resistance and weathering resistance of printed characters or images, the pigment (A) is used as a colorant for the ink. The pigment (A) may be either an inorganic pigment or an organic pigment and may also be used in combination with an extender pigment, if required.

Examples of the inorganic pigment include carbon blacks and metal oxides, etc. In particular, carbon blacks are preferably used for black inks. The carbon blacks may include furnace blacks, thermal lamp blacks, acetylene blacks and channel blacks.

Specific examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

The hue of the organic pigment used in the present invention is not particularly limited, and there may be used any chromatic color pigments having a yellow color, a magenta color, a cyan color, a blue color, a red color, an orange color, a green color, etc.

Specific examples of the preferred organic pigments include one or more pigments selected from the group consisting of commercially available products marketed under the tradenames C.I. Pigment Yellow, C.I. Pigment Red, C.I. Pigment Orange, C.I. Pigment Violet, C.I. Pigment Blue and C.I. Pigment Green, etc., with various product numbers.

Examples of the extender pigment include silica, calcium carbonate and talc.

The pigment (A) contained in the water-based ink may be in the form of a self-dispersible pigment, a pigment dispersed with a dispersant, or pigment-containing water-insoluble polymer particles.

Among them, from the viewpoint of improving quick-drying fixing properties and long-term fixing properties of the water-based ink as well as image uniformity of printed characters or images when printed on a low-water absorbing recording medium, the pigment (A) contained in the water-based ink is preferably in the form of the water-insoluble polymer (a) particles containing the pigment (A) (hereinafter also referred to merely as "pigment-containing polymer particles").

[Water-Insoluble Polymer (a) Particles Containing Pigment (A) (Pigment-Containing Polymer Particles)]

(Water-Insoluble Polymer (a))

The water-insoluble polymer (a) (hereinafter also referred to merely as a "component (a)") has not only a function as a pigment dispersant capable of exhibiting the effect of dispersing the pigment in the ink, but also a function as a fixing agent for fixing the pigment on a recording medium. The term "water-insoluble" as used herein means that the polymer has a solubility in water of not more than 10 g when the polymer is dried to constant weight at 105° C. for 2 hours and then dissolved in 100 g of water at 25° C. The solubility in water of the water-insoluble polymer (a) is preferably not more than 5 g and more preferably not more than 1 g. In the case where the water-insoluble polymer (a) is in the form of an anionic polymer, the solubility thereof means a solubility of the polymer whose anionic groups are neutralized completely (i.e., 100%) with sodium hydroxide. Also, in the case where the water-insoluble polymer (a) is in the form of a cationic polymer, the solubility thereof means a solubility of the polymer whose cationic groups are neutralized completely (i.e., 100%) with hydrochloric acid.

Examples of the configuration of the water-insoluble polymer (a) present in the water-based ink include the configuration in which the polymer is adsorbed onto the pigment, the configuration in which the pigment is enclosed (encapsulated) in the polymer, and the configuration in which the polymer is not adsorbed onto the pigment. In the present invention, from the viewpoint of improving dispersion stability of the pigment, the water-insoluble polymer (a) is preferably present in the form of pigment-containing polymer particles, and more preferably present in the configuration in which the pigment is enclosed (encapsulated) in the polymer.

Examples of the polymer used in the present invention include polyesters, polyurethanes and vinyl-based polymers. Among these polymers, preferred are vinyl-based polymers obtained by addition-polymerizing vinyl monomers (such as vinyl compounds, vinylidene compounds and vinylene compounds), from the viewpoint of improving storage stability of the resulting ink.

The vinyl-based polymer used in the present invention is preferably a vinyl-based polymer that is produced by copolymerizing a monomer mixture containing (a-1) an ionic monomer (hereinafter also referred to merely as a "component (a-1)") and (a-2) a hydrophobic monomer (hereinafter also referred to merely as a "component (a-2)") (such a mixture is hereinafter also referred to merely as a "monomer mixture"). The vinyl-based polymer contains a constitutional unit derived from the component (a-1) and a constitutional unit derived from the component (a-2). Among them, it is more preferred that the vinyl-based polymer further contains a constitutional unit derived from (a-3) a macromonomer (hereinafter also referred to merely as a "component (a-3)").

[(a-1) Ionic Monomer]

The ionic monomer (a-1) is preferably used as a monomer component of the water-insoluble polymer (a) from the viewpoint of improving dispersion stability of the pigment-containing polymer particles in the ink. Examples of the ionic monomer include anionic monomers and cationic monomers. Among these monomers, preferred are anionic monomers. Meanwhile, the ionic monomers may include those monomers that have no ionicity under neutral conditions, such as an acid, an amine, an amide compound or the like, but are rendered ionic under acid or alkaline conditions.

Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Among the aforementioned anionic monomers, from the viewpoint of improving dispersion stability of the pigment-containing polymer particles in the ink, preferred are the carboxylic acid monomers, and more preferred are acrylic acid and methacrylic acid.

Examples of the cationic monomers include N,N-dimethylaminoethyl methacrylate and N,N-dimethylaminoethyl acrylamide.

[(a-2) Hydrophobic Monomer]

The hydrophobic monomer (a-2) is preferably used as a monomer component of the water-insoluble polymer (a) from the viewpoint of improving dispersion stability of the pigment-containing polymer particles in the ink. Examples of the hydrophobic monomer include alkyl (meth)acrylic acid esters and aromatic group-containing monomers.

The alkyl (meth)acrylic acid esters are those compounds preferably containing an alkyl group having 1 to 22 carbon atoms and more preferably an alkyl group having 6 to 18 carbon atoms. Examples of the alkyl (meth)acrylic acid esters include methyl (meth)acrylate, ethyl (meth)acrylate, (iso)propyl (meth)acrylate, (iso- or tertiary-)butyl (meth) acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" as used herein mean both the structure in which the groups expressed by "iso or tertiary" and "iso" respectively are present, and the structure in which these groups are not present (i.e., normal). Also, the term "(meth)acrylic acid" means at least one compound selected from the group consisting of acrylic acid and methacrylic acid, whereas the term "(meth)acrylic acid ester" means at least one compound selected from the group consisting of an acrylic acid ester and a methacrylic acid ester. Accordingly, the term "(meth)acrylate" means at least one compound selected from the group consisting of an acrylate and a methacrylate. The term "(meth)" as described hereinafter is also defined in the same way.

The aromatic group-containing monomer is preferably a vinyl monomer containing an aromatic group having 6 to 22 carbon atoms which may contain a substituent group having a hetero atom, and more preferably a styrene-based monomer or an aromatic group-containing (meth)acrylic acid ester.

Specific examples of the preferred styrene-based monomer include styrene, 2-methyl styrene and divinyl benzene. Among these styrene-based monomers, more preferred is styrene.

Specific examples of the preferred aromatic group-containing (meth)acrylic acid ester include benzyl (meth)acrylate and phenoxyethyl (meth)acrylate. Among these aromatic group-containing (meth)acrylic acid esters, more preferred is benzyl (meth)acrylate.

As the hydrophobic monomer (a-2), two or more kinds of the above monomers may be used in combination, and a combination of the styrene-based monomer and the aromatic group-containing (meth)acrylic acid ester may also be used.

[(a-3) Macromonomer]

The macromonomer (a-3) is in the form of a compound containing a polymerizable functional group at one terminal end thereof and having a number-average molecular weight of not less than 500 and not more than 100,000, and is preferably used as a monomer component of the water-insoluble polymer (a) from the viewpoint of improving dispersion stability of the pigment-containing polymer particles in the ink. The polymerizable functional group bonded to one terminal end of the macromonomer is preferably an acryloyloxy group or a methacryloyloxy group and more preferably a methacryloyloxy group.

The macromonomer (a-3) preferably has a number-average molecular weight of not less than 1,000 and not more than 10,000. Meanwhile, the number-average molecular weight of the macromonomer (a-3) may be measured by gel permeation chromatography using chloroform containing 1 mmol/L of dodecyl dimethylamine as a solvent and using polystyrene as a reference standard substance.

As the macromonomer (a-3), from the viewpoint of improving dispersion stability of the pigment-containing polymer particles in the ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described with respect to the above hydrophobic monomer (a-2). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., etc.

Examples of the silicone-based macromonomer include organopolysiloxanes containing a polymerizable functional group bonded to one terminal end thereof, etc.

[(a-4) Nonionic Monomer]

From the viewpoint of improving dispersion stability of the pigment-containing polymer particles in the ink, it is preferred that the water-insoluble polymer (a) further contains (a-4) a nonionic monomer (hereinafter also referred to merely as a "component (a-4)") as a monomer component thereof.

Examples of the component (a-4) include 2-hydroxyethyl (meth)acrylate, 3-hydroxypropyl (meth)acrylate, a polyalkylene glycol (meth)acrylate such as polypropylene glycol (n=2 to 30 wherein n represents an average molar number of addition of oxyalkylene groups: hereinafter defined in the same way) (meth)acrylate and polyethylene glycol (n=2 to 30) (meth)acrylate, an alkoxy polyalkylene glycol (meth) acrylate such as methoxy polyethylene glycol (n=1 to 30) (meth)acrylate, and phenoxy (ethylene glycol/propylene glycol copolymer) (n=1 to 30 in which n for ethylene glycol: 1 to 29) (meth)acrylate.

Specific examples of commercially available products of the component (a-4) include "NK ESTER M-20G", "NK ESTER M-40G", "NK ESTER M-90G" and "NK ESTER M-230G" all available from Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400", "BLEMMER PP-500", "BLEMMER PP-800", "BLEMMER PP-1000", "BLEMMER AP-150", "BLEMMER AP-400", "BLEMMER AP-550", "BLEMMER 50PEP-300", "BLEMMER 50POEP-800B" and "BLEMMER 43PAPE-600B" all available from NOF Corporation.

These components (a-1) to (a-4) may be respectively used alone or in the form of a mixture of any two or more thereof.

(Contents of Respective Components or Constitutional Units in Monomer Mixture or Polymer)

The contents of the aforementioned components (a-1) to (a-4) in the monomer mixture (contents of non-neutralized components; hereinafter defined in the same way) upon production of the water-insoluble polymer (a), or the contents of the constitutional units derived from the components (a-1) to (a-4) in the water-insoluble polymer (a) are as follows, from the viewpoint of improving dispersion stability of the pigment-containing polymer particles in the resulting ink.

The content of the component (a-1) is preferably not less than 3% by mass, more preferably not less than 5% by mass and even more preferably not less than 7% by mass, and is also preferably not more than 30% by mass, more preferably not more than 25% by mass and even more preferably not more than 20% by mass.

The content of the component (a-2) is preferably not less than 25% by mass, more preferably not less than 30% by mass and even more preferably not less than 35% by mass, and is also preferably not more than 60% by mass, more preferably not more than 55% by mass and even more preferably not more than 50% by mass.

In the case of including the component (a-3), the content of the component (a-3) is preferably not less than 5% by mass, more preferably not less than 10% by mass and even more preferably not less than 15% by mass, and is also preferably not more than 30% by mass, more preferably not more than 25% by mass and even more preferably not more than 20% by mass.

In the case of including the component (a-4), the content of the component (a-4) is preferably not less than 5% by mass, more preferably not less than 10% by mass and even more preferably not less than 15% by mass, and is also preferably not more than 40% by mass, more preferably not more than 35% by mass and even more preferably not more than 30% by mass.

In addition, in the case of including the component (a-3), the mass ratio of the component (a-1) to a sum of the component (a-2) and the component (a-3) [component (a-1)/ [component (a-2)+component (a-3)]] is preferably from 0.01 to 1, more preferably from 0.05 to 0.60 and even more preferably from 0.10 to 0.40.

(Production of Water-Insoluble Polymer (a))

The water-soluble polymer (a) used in the present invention may be produced by copolymerizing the monomer mixture by known polymerization methods such as bulk polymerization, solution polymerization, suspension polymerization and emulsion polymerization. Among these polymerization methods, preferred is the solution polymerization.

The solvent used in the solution polymerization method is not particularly limited, and is preferably a polar organic solvent such as aliphatic alcohols having 1 to 3 carbon atoms, ketones, ethers and esters. Specific examples of the solvent include methanol, ethanol, acetone and methyl ethyl ketone. Of these solvents, preferred is methyl ethyl ketone.

The polymerization may also be carried out in the presence of a polymerization initiator or a chain transfer agent. As the polymerization initiator, preferred are azo compounds, and more preferred is 2,2'-azobis(2,4-dimethylvaleronitrile). As the chain transfer agent, preferred are mercaptans, and more preferred is 2-mercaptoethanol.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours. Further, the polymerization is preferably conducted in a nitrogen gas atmosphere or an atmosphere of an inert gas such as argon.

After completion of the polymerization reaction, the polymer thus produced may be isolated from the reaction solution by a known method such as reprecipitation and removal of the solvent by distillation. The thus obtained polymer may be further subjected to reprecipitation, membrane separation, chromatography, extraction, etc., for removing unreacted monomers, etc., therefrom.

The water-insoluble polymer (a) is preferably used as such in the form of the water-insoluble polymer (a) solution without removing the solvent used in the polymerization reaction therefrom in order to use the organic solvent contained therein as an organic solvent in the below-mentioned step 1, from the viewpoint of enhancing productivity of the below-mentioned water dispersion of the pigment-containing polymer particles.

The solid content of the water-insoluble polymer (a) solution is preferably not less than 30% by mass and more preferably not less than 40% by mass, and is also preferably not more than 70% by mass and more preferably not more than 65% by mass, from the viewpoint of enhancing productivity of the water dispersion of the pigment-containing polymer particles.

The weight-average molecular weight of the water-insoluble polymer (a) used in the present invention is preferably not less than 5,000, more preferably not less than 10,000 and even more preferably not less than 20,000, and is also preferably not more than 500,000, more preferably not more than 400,000, even more preferably not more than 300,000 and further even more preferably not more than 200,000, from the viewpoint of improving dispersion stability of the pigment-containing polymer particles in the resulting ink as well as from the viewpoint of improving fixing properties of the ink when printed on a low-water absorbing recording medium.

Meanwhile, the weight-average molecular weight may be measured by the method described in Examples below.

[Production of Pigment-Containing Polymer Particles]

The water-based ink for ink-jet printing according to the present invention may include the water-insoluble polymer (a) particles containing the pigment (A).

The water-insoluble polymer (a) particles containing the pigment (A) (pigment-containing polymer particles) can be efficiently produced in the form of a water dispersion thereof by the process including the following steps I and II.

Step I: subjecting a mixture of the water-insoluble polymer (a), an organic solvent, the pigment (A) and water (hereinafter also referred to merely as a "pigment mixture") to dispersion treatment to obtain a dispersion of pigment-containing polymer particles; and Step II: removing the organic solvent from the dispersion obtained in the step I to obtain a water dispersion of the pigment-containing polymer particles (hereinafter also referred to merely as a "pigment water dispersion").

(Step I)

In the step I, it is preferred that the water-insoluble polymer (a) is first dissolved in the organic solvent, and then the pigment (A) and water, if required, together with a neutralizing agent, a surfactant and the like, are added and mixed in the resulting organic solvent solution to obtain a dispersion of an oil-in-water type. The order of addition of the respective components added to the organic solvent solution of the water-insoluble polymer (a) is not particularly limited, and it is preferred that water, the neutralizing agent and the pigment (A) are successively added in this order.

The organic solvent in which the water-insoluble polymer (a) can be dissolved is not particularly limited, and is preferably selected from aliphatic alcohols having 1 to 3 carbon atoms, ketones, ethers, esters and the like. Of these organic solvents, from the viewpoint of improving wettability to the pigment (A), capability of dissolving the water-insoluble polymer (a) therein and adsorption of the water-insoluble polymer (a) onto the pigment (A), more preferred are ketones having not less than 4 and not more than 8 carbon atoms, even more preferred are methyl ethyl ketone and methyl isobutyl ketone, and further even more preferred is methyl ethyl ketone.

When the water-insoluble polymer (a) is synthesized by the solution polymerization method, the solvent used in the polymerization method may be directly used as such in the step I.

(Neutralization)

When the water-insoluble polymer (a) is an anionic polymer, an anionic group contained in the water-insoluble polymer (a) may be neutralized using a neutralizing agent. When using the neutralizing agent, the pH value of the water-insoluble polymer (a) neutralized is preferably controlled to not less than 7 and not more than 11.

Examples of the neutralizing agent include hydroxides of alkali metals, ammonia and organic amines. Specific examples of the hydroxides of alkali metals include lithium hydroxide, sodium hydroxide, potassium hydroxide and cesium hydroxide. Of these hydroxides of alkali metals, preferred is sodium hydroxide. Specific examples of the organic amines include trimethylamine, ethylamine, diethylamine, triethylamine and triethanolamine.

Of these neutralizing agents, from the viewpoint of improving ejection stability and storage stability of the resulting ink, preferred are the hydroxides of alkali metals and ammonia, and more preferred is a combination of sodium hydroxide and ammonia. Also, the water-insoluble polymer (a) may be previously neutralized.

The neutralizing agent is preferably used in the form of an aqueous neutralizing agent solution from the viewpoint of sufficiently and uniformly promoting the neutralization of the polymer. From the aforementioned viewpoint, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The degree of neutralization of the anionic group in the water-insoluble polymer (a) is preferably not less than 30 mol %, more preferably not less than 40 mol % and even more preferably not less than 50 mol %, and is also preferably not more than 300 mol %, more preferably not more than 200 mol % and even more preferably not more than 150 mol %, from the viewpoint of improving dispersion stability and storage stability of the pigment-containing polymer particles in the pigment water dispersion and the ink.

The degree of neutralization as used herein means the value calculated by dividing a mole equivalent amount of the neutralizing agent by a molar amount of the anionic group in the water-insoluble polymer (a).

(Contents of Respective Components in Pigment Mixture)

The content of the pigment (A) in the pigment mixture used in the step I is preferably not less than 10% by mass, more preferably not less than 12% by mass and even more preferably not less than 14% by mass, and is also preferably not less than 30% by mass, more preferably not more than 25% by mass and even more preferably not more than 20% by mass, from the viewpoint of improving dispersion stability of the pigment-containing polymer particles in the pigment water dispersion and the ink as well as from the viewpoint of enhancing productivity of the pigment water dispersion.

The content of the water-insoluble polymer (a) in the pigment mixture is preferably not less than 2.0% by mass, more preferably not less than 4.0% by mass and even more preferably not less than 5.0% by mass, and is also preferably not more than 15% by mass, more preferably not more than 12% by mass and even more preferably not more than 10% by mass, from the viewpoint of improving dispersion stability of the pigment water dispersion, from the viewpoint of improving quick-drying fixing properties and long-term fixing properties of the ink when printed on a low-water absorbing recording medium, and from the viewpoint of improving storage stability and ejection stability of the ink.

The content of the organic solvent in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass, from the viewpoint of improving wettability to the pigment (A) and adsorption of the water-insoluble polymer (a) to the pigment.

The content of water in the pigment mixture is preferably not less than 40% by mass, more preferably not less than 45% by mass and even more preferably not less than 50% by mass, and is also preferably not more than 70% by mass, more preferably not more than 65% by mass and even more preferably not more than 60% by mass, from the viewpoint of improving dispersion stability of the pigment water dispersion and enhancing productivity of the pigment water dispersion.

The mass ratio of the pigment (A) to the water-insoluble polymer (a) [(A)/(a)] in the pigment mixture is preferably not less than 30/70, more preferably not less than 40/60 and even more preferably not less than 50/50, and is also preferably not more than 90/10, more preferably not more than 80/20 and even more preferably not more than 75/25, from the viewpoint of improving dispersion stability of the pigment water dispersion, from the viewpoint of improving quick-drying fixing properties and long-term fixing properties of the ink when printed on a low-water absorbing recording medium, and from the viewpoint of improving storage stability and ejection stability of the ink.

(Dispersion Treatment of Pigment Mixture)

In the step I, the pigment mixture is subjected to dispersion treatment to obtain a dispersion of the pigment-containing polymer particles. The dispersing method for obtaining the above dispersion is not particularly limited. The pigment particles may be atomized into fine particles having a desired average particle size only by a substantial dispersion treatment. Preferably, the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in the step I is preferably not lower than 0° C., and is also preferably not higher than 40° C., more preferably not higher than 30° C. and even more preferably not higher than 20° C. The dispersing time is preferably not less than 0.5 hour and more preferably not less than 1 hour, and is also preferably not more than 30 hours, more preferably not more than 10 hours and even more preferably not more than hours.

When subjecting the pigment mixture to the preliminary dispersion treatment, there may be used ordinary mixing or stirring devices such as anchor blades and disper blades. Of these devices, preferred are high-speed stirring mixers.

As a means for applying a shear stress to the pigment mixture in the substantial dispersion treatment, there may be used, for example, kneading machines such as roll mills and kneaders, high-pressure homogenizers such as "MICROFLUIDIZER" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes through the homogenizer used in the substantial dispersion treatment.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

Also, the number of passes through the homogenizer used in the substantial dispersion treatment is preferably not less than 3 and more preferably not less than 10, and is also preferably not more than 30 and more preferably not more than 25.

(Step II)

In the step II, the organic solvent is removed from the dispersion obtained in the step I by any known methods to obtain a water dispersion of the pigment-containing polymer particles (pigment water dispersion). The organic solvent is preferably substantially completely removed from the thus obtained pigment water dispersion. However, the residual organic solvent may be present in the pigment water dispersion unless the objects and effects of the present invention are adversely affected by the residual organic solvent. The content of the residual organic solvent in the pigment water dispersion is preferably not more than 0.1% by weight and more preferably not more than 0.01% by weight.

In addition, if required, the dispersion may be subjected to heating and stirring treatments before removing the organic solvent by distillation therefrom.

In the thus-obtained pigment water dispersion, the solid water-insoluble polymer (a) particles containing the pigment (A) are dispersed in a medium containing water as a main medium. The configuration of the pigment-containing polymer particles in the pigment water dispersion is not particularly limited, and the pigment-containing polymer particles may have any configuration as long as the particles are formed of at least the pigment (A) and the water-insoluble polymer (a). Examples of the configuration of the pigment-containing polymer particles include the particle configuration in which the pigment (A) is enclosed (encapsulated) in the water-insoluble polymer (a), the particle configuration in which the pigment (A) is uniformly dispersed in the water-insoluble polymer (a), and the particle configuration in which the pigment (A) is exposed onto a surface of the respective water-insoluble polymer (a) particles, as well as mixtures of these configurations.

The concentration of the non-volatile components (solid content) in the resulting pigment water dispersion is preferably not less than 10% by mass and more preferably not less than 15% by mass, and is also preferably not more than 30% by mass and more preferably not more than 25% by mass, from the viewpoint of improving dispersion stability of the pigment water dispersion as well as from the viewpoint of facilitating preparation of the water-based ink.

The average particle size of the pigment-containing polymer particles in the pigment water dispersion is preferably not less than 40 nm, more preferably not less than 60 nm and even more preferably not less than 75 nm, and is also preferably not more than 150 nm, more preferably not more than 120 nm and even more preferably not more than 110 nm, from the viewpoint of suppressing formation of coarse particles and improving ejection stability of the water-based ink.

Meanwhile, the average particle size of the pigment-containing polymer particles in the pigment water dispersion may be measured by the method described in Examples below.

In addition, the average particle size of the pigment-containing polymer particles in the water-based ink is the same as the average particle size of the particles in pigment water dispersion, and the preferred ranges of the average particle size of the pigment-containing polymer particles in the water-based ink are also the same as those of the average particle size of the particles in pigment water dispersion.

<Resin Particles (B)>

The resin particles (B) are used from the viewpoint of promoting drying of the printed characters or images on an ink-jet recording medium (on a surface of paper), improving film-forming properties of the ink, and improving quick-drying fixing properties and long-term fixing properties of the ink when printed on a low-water absorbing recording medium.

In the present invention, the resin particles (B) are those resin particles produced by emulsion polymerization method. As the configuration of the resin particles (B), from the viewpoint of enhancing productivity of the water-based ink, there may be mentioned a water dispersion prepared by dispersing the resin particles (B) in the form of a continuous phase in water, and the dispersion may also contain a dispersant such as a surfactant, if required. The water dispersion containing the resin particles (B) is produced by subjecting the monomer mixture to emulsion polymerization.

The water-insoluble polymer (a) used in the water-insoluble polymer particles containing the pigment (A) and the resin constituting the resin particles (B) may be identical to or different from each other. In the case where the pigment is contained in resin particles, and the resin particles are produced by emulsion polymerization method, the resin particles containing the pigment are regarded as corresponding to both of the pigment (A) and the resin particles (B), and in such a case, the contents and mass ratios of the pigment (A) and the resin particles (B), etc., may be calculated from contents of the respective components in the pigment-containing resin particles. The resin particles (B) also act as a fixing emulsion used for fixing droplets of the ink on a recording medium and improving optical density, gloss and rub fastness of the printed characters or images.

The resin particles (B) used in the present invention are preferably in the form of particles constituted of a resin obtained by subjecting an ethylenically unsaturated monomer to emulsion polymerization.

Examples of the resin obtained by subjecting the ethylenically unsaturated monomer to emulsion polymerization include an acrylic resin, a vinyl acetate-based resin, a styrene-butadiene-based resin, a vinyl-chloride-based resin, a styrene-(meth)acrylic resin, a butadiene-based resin and a styrene-based resin. Of these resins, from the viewpoint of promoting drying of the printed characters or images on an ink-jet recording medium (on a surface of paper), improving quick-drying fixing properties and long-term fixing properties of the ink when printed on a low-water absorbing recording medium, and improving storage stability and ejection stability of the resulting ink, preferred are an acrylic resin and a styrene-acrylic resin, and more preferred is an acrylic resin. In addition, these resin particles (B) may be used alone or in the form of a mixture of any two or more thereof.

The weight-average molecular weight of the resin particles (B) is preferably not less than 70,000, more preferably not less than 100,000, even more preferably not less than 150,000 and further even more preferably not less than 200,000, from the viewpoint of promoting drying of the printed characters or images by removal of the solvent from the ink, and improving quick-drying fixing properties and long-term fixing properties of the ink. On the other hand, from the viewpoint of reducing viscosity of the resulting ink and improving storage stability and ejection stability of the ink, the weight-average molecular weight of the resin particles (B) is preferably not more than 1,200,000, more preferably not more than 1,100,000, even more preferably not more than 1,000,000 and further even more preferably not more than 900,000.

Meanwhile, the weight-average molecular weight of the resin particles (B) may be measured by the method described in Examples below.

[Emulsion Polymerization]

The emulsion polymerization as used in the present invention means the method in which the monomer mixture is emulsified or dispersed in a dispersing medium containing water as a main component in the presence of a surfactant, and then polymerized using a water-soluble polymerization initiator. The surfactant includes not only an ordinary surfactant but also a reactive surfactant.

As the water-soluble polymerization initiator used in the emulsion polymerization, there may be used any conventionally known water-soluble polymerization initiators. Examples of the water-soluble polymerization initiator include inorganic peroxides such as potassium persulfate, sodium persulfate, ammonium persulfate and hydrogen peroxide; and azo-based initiators such as 2,2'-azobis(2-amidinopropane) dihydrochloride. In addition, as the water-soluble polymerization initiator, there may also be used redox-based initiators formed of a combination of the peroxide compound with a reducing agent such as sodium sulfite, etc.

The surfactant acts for providing a polymerization field by emulsification and suspension of the monomer as well as formation of micelles, and improving dispersion stability of the resin particles, etc. The surfactant used in the emulsion polymerization is not particularly limited, and suitably an anion-based surfactant. Examples of the anion-based surfactant include sulfate- or sulfonate-based surfactants, e.g., linear alkylbenzenesulfonic acid salts such as sodium dodecylbenzenesulfonate, polyoxyethylene alkylsulfuric acid salts such as sodium polyoxyethylene alkylether sulfate and alkylsulfuric acid salts, sulfosuccinic acid-based surfactants, taurate-based surfactants, isethionate-based surfactants and α-olefin sulfonic acid-based surfactants. Examples of a carboxylate-based surfactant usable in the present invention include fatty acid soaps such as sodium laurate, ether carboxylic acid-based surfactants and acylated amino acid-based surfactants. Examples of a phosphoric acid ester-based surfactant usable in the present invention include alkyl phosphoric acid salts.

Examples of commercially available products of the surfactant include "EMAL 20CM", "EMAL D-3-D", "EMAL D-4-D", "EMAL 20C", "EMAL 27C", "EMAL 270J", "LATEMUL E-118B" and "LATEMUL E-150" all available from Kao Corporation, etc.

The reactive surfactant as used in the present invention means those surfactants containing at least one radical-polymerizable unsaturated double bond in a molecule thereof. The reactive surfactant has excellent monomer emulsifying properties, and is capable of producing a water dispersion of resin particles having excellent stability.

The reactive surfactant preferably contains at least one hydrophobic group such as a linear or branched alkyl group or alkenyl group having 8 to 30 carbon atoms, and at least one hydrophilic group such as an ionic group and an oxyalkanediyl group, and is preferably either an anionic surfactant or a nonionic surfactant. The ionic group is preferably an anionic group, and more preferably a carboxy group, a sulfonic group, a sulfuric group, a phosphoric group or a base-neutralized group thereof. The oxyalkanediyl group preferably has 1 to 4 carbon atoms, and the average polymerization degree of a repeating unit of the oxyalkanediyl group is preferably from 1 to 100. Among them, the oxyalkanediyl group is more preferably at least one group selected from the group consisting of an oxyethylene group and an oxyethylene-1,2-diyl group.

Specific examples of the reactive surfactant include sulfosuccinic acid ether-based surfactants (e.g., such as "LATEMUL S-120P" and "LATEMUL S-180A" both available from Kao Corporation, and "ELEMINOL JS-2" available from Sanyo Chemical Industries Ltd.), and alkylether-based surfactants (e.g., such as "AQUALON KH-05", "AQUALON KH-10" and "AQUALON KH-20" all available from DSK Co., Ltd.).

In the emulsion polymerization, a chain transfer agent may also be used. Examples of the chain transfer agent include mercaptans such as n-dodecyl mercaptan, t-dodecyl mercaptan and n-octyl mercaptan; xanthogens such as dimethyl xanthogen disulfide and diisobutyl xanthogen disulfide; and dipentene, indene, 1,4-cyclohexadiene, dihydrofuran and xanthene.

The dispersing medium used in the emulsion polymerization may contain, in addition to water, an optional organic solvent.

Examples of the organic solvent that may be optionally used in the dispersing medium include alcohols having 1 to 6 carbon atoms, ketones, ethers, amides, aromatic hydrocarbons and aliphatic hydrocarbons having 5 to 10 carbon atoms.

The proportion between water and the organic solvent in the dispersing medium is not particularly limited. The proportion of water to a whole amount of the dispersing medium is preferably not less than 50% by mass, more preferably not less than 65% by mass, even more preferably not less than 75% by mass and further even more preferably not less than 80% by mass.

The conditions of the emulsion polymerization are not particularly limited. The amount of the monomer mixture used in the emulsion polymerization is preferably not less than 10% by mass, more preferably not less than 20% by mass and even more preferably not less than 30% by mass, on the basis of the whole reaction system used in the emulsion polymerization, and is also preferably not more than 70% by mass, more preferably not more than 60% by mass and even more preferably not more than 50% by mass, on the basis of the whole reaction system used in the emulsion polymerization.

The monomers may be added by conventionally known methods such as a monomer dropwise addition method, a monomer batch charging method and a pre-emulsion method. Of these methods, from the viewpoint of attaining good polymerization stability, the pre-emulsion method is preferably used.

From the viewpoint of suppressing formation of coarse particles, the pre-emulsion is prepared using a rotary stirring device. For example, in the case where a 1 L-scale mixer equipped with a double blade having a diameter of 10 cm is used as the rotary stirring device, the rotating speed of the rotary stirring device is preferably not less than 200 rpm and more preferably not less than 300 rpm, and is also preferably not more than 5000 rpm, more preferably not more than 2000 rpm and even more preferably not more than 1000 rpm. The stirring time is preferably not less than 10 minutes, and is also preferably not more than 30 minutes.

In the pre-emulsion method, the time of the dropwise addition of the pre-emulsion is preferably not less than 0.5 hour and more preferably not less than 1 hour from the viewpoint of obtaining emulsified particles having a uniform particle size in the resulting emulsion, and is also preferably not more than 8 hours and more preferably not more than 6 hours from the viewpoint of improving reactivity of the emulsion polymerization. The aging time is preferably not less than 0.5 hour and more preferably not less than 1 hour, and is also preferably not more than 5 hours and more preferably not more than 3 hours.

The polymerization temperature used upon the emulsion polymerization may be appropriately controlled according to a decomposition temperature of the polymerization initiator, and is preferably not lower than 50° C., more preferably not lower than 60° C. and even more preferably not lower than 70° C. from the viewpoint of improving reactivity of the emulsion polymerization, and is also preferably not higher than 90° C. and more preferably not higher than 85° C. from the viewpoint of improving the molecular weight distribution of the resulting polymer.

The polymerization temperature when using a persulfate as the water-soluble polymerization initiator is preferably not lower than 70° C. and more preferably not lower than 75° C. from the viewpoint of improving reactivity of the emulsion polymerization, and is also preferably not higher than 85° C. and more preferably not higher than 83° C. from the viewpoint of improving the molecular weight distribution of the resulting polymer.

The polymerization atmosphere is preferably a nitrogen atmosphere or an atmosphere of an inert gas such as argon from the viewpoint of improving reactivity of the emulsion polymerization.

The amount of the water-soluble polymerization initiator used upon the emulsion polymerization is preferably not less than 0.01 part by mass, more preferably not less than 0.05 part by mass and even more preferably not less than 0.1 part by mass, and is also preferably not more than 5 parts by mass, more preferably not more than 3 parts by mass and even more preferably not more than 1 part by mass, on the basis of 100 parts by mass of the monomer mixture, from the viewpoint of enhancing a yield of the obtained polymer and well controlling a molecular weight distribution of the polymer.

The amount of the surfactant used upon the emulsion polymerization is preferably not less than 0.1 part by mass, more preferably not less than 0.5 part by mass and even more preferably not less than 1 part by mass, and is also preferably not more than 40 parts by mass, more preferably not more than 25 parts by mass, even more preferably not more than 10 parts by mass and further even more preferably not more than 5 parts by mass, on the basis of 100 parts by mass of the monomer mixture, from the viewpoint of stably conducting the emulsion polymerization and reducing a residual amount of the surfactant in the emulsion polymerization.

[Acrylic Resin Particles]

The resin particles (B) are preferably in the form of particles constituted of an acrylic resin (hereinafter also referred to as "acrylic resin particles"). From the viewpoint of improving quick-drying fixing properties and long-term fixing properties of the resulting ink when printed on a low-water absorbing recording medium, the acrylic resin particles are more preferably used in the form of a water dispersion containing a (meth)acrylic acid-based copolymer obtained by subjecting a monomer mixture containing a constitutional unit derived from (meth)acrylic acid and a constitutional unit derived from a (meth)acrylic acid ester in which a total content of these constitutional units is not less than 90% by mass, to emulsion polymerization.

[(Meth)Acrylic Acid-Based Copolymer]

The weight-average molecular weight of the aforementioned (meth)acrylic acid-based copolymer is preferably not less than 70,000, more preferably not less than 100,000, even more preferably not less than 150,000 and further even more preferably not less than 200,000 from the viewpoint of improving quick-drying fixing properties and long-term fixing properties of the resulting ink, and is also preferably not more than 1,200,000, more preferably not more than 1,100,000, even more preferably not more than 1,000,000 and further even more preferably not more than 900,000 from the viewpoint reducing viscosity of the resulting ink and improving storage stability and ejection stability of the ink.

Meanwhile, the weight-average molecular weight of the (meth)acrylic acid-based copolymer may be measured by the method described in Examples below.

[Production of (Meth)Acrylic Acid-Based Copolymer]

The (meth)acrylic acid-based copolymer is produced by using the monomer mixture containing (meth)acrylic acid and a (meth)acrylic acid ester.

Specific examples of the preferred (meth)acrylic acid ester include an alkyl (meth)acrylate containing an alkyl group having 1 to 10 carbon atoms and preferably an alkyl group having 1 to 8 carbon atoms, and an aromatic group-containing (meth)acrylate. Specific examples of these (meth)acrylates include methyl (meth)acrylate, ethyl (meth)acrylate, propyl (meth)acrylate, (iso- or tertiary-)butyl (meth)acrylate, amyl (meth)acrylate, cyclohexyl (meth)acrylate, benzyl (meth)acrylate, 2-ethylhexyl (meth)acrylate, (iso)octyl (meth)acrylate, decyl (meth)acrylate, dodecyl (meth)acrylate, stearyl (meth)acrylate, 2-hydroxyethyl (meth)acrylate and 3-hydroxypropyl (meth)acrylate.

Of these (meth)acrylates, preferred is at least one (meth)acrylate selected from the group consisting of methyl (meth)acrylate, ethyl (meth)acrylate and 2-ethylhexyl (meth)acrylate.

The monomer mixture may also contain monomers other than the (meth)acrylic acid and (meth)acrylic acid ester. Specific examples of the monomers other than the (meth)acrylic acid and (meth)acrylic acid ester include the aforementioned ionic monomers and the aforementioned aromatic ring-containing hydrophobic monomers.

In addition, the monomer mixture may be further compounded with additional monomers such as polyethylene glycol mono(meth)acrylate, methoxy polyethylene glycol mono(meth)acrylate, octoxy polyethylene glycol mono(meth)acrylate and stearoyloxy polyethylene glycol mono(meth)acrylate, if required.

The total content of the (meth)acrylic acid and (meth)acrylic acid ester in the monomer mixture is not less than 90% by mass, preferably not less than 92% by mass, more preferably not less than 94% by mass and even more preferably not less than 96% by mass from the viewpoint of improving quick-drying fixing properties and long-term fixing properties of the resulting ink as well as image uniformity of printed characters or images when printed on a low-water absorbing recording medium, and from the viewpoint of improving ejection stability and storage stability of the ink.

The content of the (meth)acrylic acid in the whole monomer mixture is preferably not less than 0.5% by mass, more preferably not less than 1.0% by mass, even more preferably not less than 1.5% by mass and further even more preferably not less than 2.0% by mass, and is also preferably not more than 10% by mass, more preferably not more than 8% by mass and even more preferably not more than 6% by mass from the same viewpoint as described above.

The average particle size of the resin particles (B) contained in the water dispersion containing the resin particles (B) or the water-based ink is preferably not less than 10 nm, more preferably not less than 30 nm and even more preferably not less than 50 nm, and is also preferably not more than 300 nm, more preferably not more than 250 nm and even more preferably not more than 200 nm from the viewpoint of improving quick-drying fixing properties and long-term fixing properties of the resulting ink as well as image uniformity of printed characters or images when printed on a low-water absorbing recording medium, and from the viewpoint of improving ejection stability and storage stability of the ink.

Meanwhile, the average particle size of the resin particles (B) may be measured by the method described in Examples below.

<Polypropylene Glycol (X)>

The polypropylene glycol (X) is used from the viewpoint of improving ejection stability of the resulting ink.

The average polymerization degree of the polypropylene glycol (X) is preferably not less than 5 and more preferably not less than 6 from the viewpoint of improving viscosity and ejection stability of the resulting ink. In addition, from the same viewpoint as described above, the average polymerization degree of the polypropylene glycol (X) is preferably not more than 45, more preferably not more than 40, even more preferably not more than 35 and further even more preferably not more than 30. Also, the polypropylene glycol (X) has a distribution of a polymerization degree thereof, i.e., is constituted of a plurality of components that are different in polymerization degree from each other, and preferably contains polypropylene glycol components having a polymerization degree of not less than 5 and not more than 45. The total contents of the polypropylene glycol components having a polymerization degree of not less than 5 and not more than 45 in the polypropylene glycol (X) is preferably not less than 50% by mass, more preferably not less than 70% by mass, even more preferably not less than 90% by mass, further even more preferably not less than 95% by mass and still further even more preferably 100% by mass from the viewpoint of improving viscosity and ejection stability of the resulting ink. Meanwhile, the contents of the polypropylene glycol components having a polymerization degree of not less than and not more than 45 in the polypropylene glycol (X) may be calculated from mass ratios of the respective components present therein as measured by the method described in Examples below.

The average molecular weight of the polypropylene glycol (X) calculated from the polymerization degrees and mass ratios of the respective components present therein is preferably not less than 250, more preferably not less than 300, even more preferably not less than 400 and further even more preferably not less than 600 from the viewpoint of improving viscosity and ejection stability of the resulting ink. In addition, from the same viewpoint as described above, the average molecular weight of the polypropylene glycol (X) is preferably not more than 3500, more preferably not more than 3000, even more preferably not more than 2500, further even more preferably not more than 2000 and still further even more preferably not more than 1500.

Meanwhile, the polymerization degree and average molecular weight of the polypropylene glycol (X) may be measured and calculated by the methods described in Examples below.

The water-based ink for ink-jet printing used in the present invention preferably contains at least one organic solvent (C) other than the polypropylene glycol (X) which has a boiling point of not lower than 90° C. (hereinafter also referred to merely as a "component (C)"). The weighted mean value of the boiling point of the organic solvent (C) which is weighted by contents (% by mass) of respective organic solvents in the organic solvent (C) is preferably not lower than 260° C. It is more preferred that when using two or more kinds of organic solvents in the organic solvent (C), the organic solvent (C) contains a plurality of organic solvents that are different in boiling point from each other. Examples of the compound used in the organic solvent (C) include a polyhydric alcohol other than the polypropylene glycol (X) (hereinafter also referred to merely as a "polyhydric alcohol"), a polyhydric alcohol alkyl ether, a nitrogen-containing heterocyclic compound, an amide, an amine and a sulfur-containing compound. Among these compounds, from the viewpoint of improving storage stability and ejection stability of the resulting ink, preferred is at least one compound selected from the group consisting of a polyhydric alcohol and a polyhydric alcohol alkyl ether, and more preferred is a polyhydric alcohol. The polyhydric alcohol may be in the form of a mixed alcohol containing a plurality of compounds belonging to the concept of the polyhydric alcohol, and the polyhydric alcohol alkyl ether may also be in the form of a mixed ether containing a plurality of compounds belonging to the concept of the polyhydric alcohol alkyl ether.

The content of at least one compound selected from the group consisting of the polyhydric alcohol other than the polypropylene glycol (X) and the polyhydric alcohol alkyl ether in the organic solvent (C) is preferably not less than 80% by mass, more preferably not less than 90% by mass and even more preferably not less than 95% by mass.

Examples of the polyhydric alcohol other than the polypropylene glycol (X) include ethylene glycol (boiling point (hereinafter also referred to merely as "b.p.") 197° C.), diethylene glycol (b.p. 244° C.), polyethylene glycol, propylene glycol (b.p. 188° C.), dipropylene glycol (b.p. 232° C.), 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 1,6-hexanediol (b.p. 250° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.). In addition, triethylene glycol (b.p. 285° C.), tripropylene glycol (b.p. 273° C.) and glycerin (b.p. 290° C.), etc., may be used in combination with a compound having a boiling point lower than 230° C. Among these polyhydric alcohols, from the viewpoint of attaining excellent spread of the dot size and improving quick-drying fixing properties and long-term fixing properties of the ink when printed on a low-water absorbing recording medium, preferred are diethylene glycol, propylene glycol and glycerin.

Examples of the polyhydric alcohol alkyl ether include ethylene glycol monoethyl ether (b.p. 135° C.), ethylene glycol monobutyl ether (b.p. 171° C.), diethylene glycol monomethyl ether (b.p. 194° C.), diethylene glycol monoethyl ether (b.p. 202° C.), diethylene glycol monobutyl ether (b.p. 230° C.), triethylene glycol monomethyl ether (b.p. 122° C.), triethylene glycol monoisobutyl ether (b.p. 160° C.), tetraethylene glycol monomethyl ether (b.p. 158° C.), propylene glycol monoethyl ether (b.p. 133° C.), dipropylene glycol monobutyl ether (b.p. 227° C.), dipropylene glycol monomethyl ether (b.p. 90° C.), tripropylene glycol monomethyl ether (b.p. 100° C.) and tripropylene glycol monobutyl ether. In addition, triethylene glycol monobutyl ether (b.p. 276° C.), etc., may be used in combination with a compound having a boiling point lower than 230° C. Among these polyhydric alcohol alkyl ethers, from the viewpoint of attaining excellent spread of the dot size and improving quick-drying fixing properties and long-term fixing properties of the ink when printed on a low-water absorbing recording medium, preferred is dipropylene glycol monomethyl ether.

Examples of the nitrogen-containing heterocyclic compound include N-methyl-2-pyrrolidone (b.p. 202° C.), 2-pyrrolidone (b.p. 245° C.), 1,3-dimethyl imidazolidinone (b.p. 220° C.) and ε-caprolactam (b.p. 136° C.).

Examples of the amide include formamide (b.p. 210° C.), N-methyl formamide (b.p. 199° C.) and N,N-dimethyl formamide (b.p. 153° C.).

Examples of the amine include monoethanolamine (b.p. 170° C.), diethanolamine (b.p. 217° C.), triethanolamine (b.p. 208° C.) and triethylamine (b.p. 90° C.).

Examples of the sulfur-containing compound include dimethyl sulfoxide (b.p. 189° C.) and sulfolane (b.p. 285° C.). In addition, thiodiglycol (b.p. 282° C.). etc., may be used in combination with a compound having a boiling point lower than 230° C.

Among these compounds, from the viewpoint of attaining excellent spread of the dot size and improving quick-drying fixing properties and long-term fixing properties of the ink as well as image uniformity of printed characters or images when printed on a low-water absorbing recording medium and from the viewpoint of improving ejection stability of the ink, preferred is a combination of two or more kinds of polyhydric alcohols, a combination of two or more kinds of polyhydric alcohol alkyl ethers or a combination of at least one polyhydric alcohol and at least one polyhydric alcohol alkyl ether; more preferred is a combination of two or more kinds of polyhydric alcohols or a combination of at least one polyhydric alcohol and at least one polyhydric alcohol alkyl ether; and even more preferred is a combination of at least one compound selected from the group consisting of propylene glycol and diethylene glycol, and glycerin.

The mass ratio of an organic solvent (Y) as the aforementioned at least one compound selected from the group consisting of propylene glycol and diethylene glycol to glycerin [organic solvent (Y)/glycerin] in the organic solvent (C) is preferably not less than 0.5, more preferably not less than 1.0 and even more preferably not less than 1.5 from the viewpoint of promoting drying of printed characters or images and improving quick-drying fixing properties and long-term fixing properties of the ink when printed on a low-water absorbing recording medium, and is also preferably not more than 15, more preferably not more than 10 and even more preferably not more than 5 from the viewpoint of improving ejection stability of the ink.

The total content of propylene glycol, diethylene glycol and glycerin in the organic solvent (C) is preferably not less than 80% by mass, more preferably not less than 85% by mass and even more preferably not less than 90% by mass from the viewpoint of promoting drying of printed characters or images and improving quick-drying fixing properties and long-term fixing properties of the ink when printed on a low-water absorbing recording medium as well as from the viewpoint of improving ejection stability of the ink.

The total content of propylene glycol and diethylene glycol in the water-based ink is preferably not less than 5% by mass, more preferably not less than 10% by mass and even more preferably not less than 15% by mass from the viewpoint of attaining excellent spread of the dot size and improving quick-drying fixing properties and long-term fixing properties of the ink when printed on a low-water absorbing recording medium, and is also preferably not more than 40% by mass, more preferably not more than 35% by mass, even more preferably not more than 30% by mass and further even more preferably not more than 25% by mass from the same viewpoint as described above.

The content of glycerin in the water-based ink is preferably not less than 0.5% by mass, more preferably not less than 1.5% by mass and even more preferably not less than 3% by mass from the viewpoint of improving ejection stability of the resulting ink, and is also preferably not more than 20% by mass, more preferably not more than 15% by mass and even more preferably not more than 10% by mass from the viewpoint of attaining excellent spread of the dot size and improving quick-drying fixing properties and long-term fixing properties of the ink when printed on a low-water absorbing recording medium.

The weighted mean value of the boiling point of the organic solvent (C) which is weighted by contents (% by mass) of respective organic solvents in the organic solvent (C) is preferably not lower than 150° C. and more preferably not lower than 180° C. from the viewpoint of preventing dry-out of the ink in ink-jet nozzles, and is also preferably not higher than 260° C., more preferably not higher than 230° C., even more preferably not higher than 220° C. and further even more preferably not higher than 210° C. from the viewpoint of promoting drying of printed characters or images and improving quick-drying fixing properties and long-term fixing properties of the ink when printed on a low-water absorbing recording medium.

As the boiling point of the organic solvent is lowered, the saturated vapor pressure and evaporation rate of the organic solvent as measured at a predetermined specific temperature are increased. In addition, as the proportion of the organic solvent having a high evaporation rate in a mixed organic solvent as measured at a predetermined specific temperature is increased, the evaporation rate of the mixed organic solvent as measured at the predetermined specific temperature is also increased. Therefore, the weighted mean value of the boiling point of the organic solvent (C) is regarded as being an index of the evaporation rate of the mixed organic solvent.

Meanwhile, the weighted mean value of the boiling point of the organic solvent (C), for example, in the case of using a mixed solvent including diethylene glycol, glycerin and propylene glycol as the organic solvent (C), is calculated from the following formula.

[[diethylene glycol content (% by mass)×boiling point of diethylene glycol (244° C.)]+[glycerin content (% by mass)×boiling point of glycerin (290° C.)]+[propylene glycol content (% by mass)×boiling point of propylene glycol (188° C.)]]/[diethylene glycol content (% by mass)+glycerin content (% by mass)+propylene glycol content (% by mass)]=weighted mean value (° C.)

<Acetylene Glycol-Based Surfactant>

The water-based ink for ink-jet printing used in the present invention preferably further contains an acetylene glycol-based surfactant from the viewpoint of improving wetting spread of the water-based ink and enhancing image uniformity of printed characters or images when printed on a low-water absorbing recording medium.

The acetylene glycol-based surfactant is in the form of a compound having an average molar number of addition of ethyleneoxide (hereinafter also referred to merely as "EO") of preferably not more than 5 and more preferably not more than 3, and even more preferably in the form of a compound to which no EO is added, from the viewpoint of improving wetting spread of the water-based ink and enhancing image uniformity of printed characters or images when printed on a low-water absorbing recording medium. The term "average molar number of addition of ethyleneoxide of not more than 5" as used herein is intended to mean that the acetylene glycol-based surfactant is in the form of a compound to which no EO is added, i.e., a compound having an average molar number of addition of ethyleneoxide of 0.

The acetylene glycol-based surfactant is preferably at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol, 2,5,8,11-tetramethyl-6-decyne-5,8-diol, 3,5-dimethyl-1-hexyne-3-ol and EO adducts of these compounds, more preferably at least one compound selected from the group consisting of 2,4,7,9-tetramethyl-5-decyne-4,7-diol, 3,6-dimethyl-4-octyne-3,6-diol and 2,5-dimethyl-3-hexyne-2,5-diol, and even more preferably 2,4,7,9-tetramethyl-5-decyne-4,7-diol.

2,4,7,9-Tetramethyl-5-decyne-4,7-diol, 3,6-dimethyl-4-octyne-3,6-diol and 2,5-dimethyl-3-hexyne-2,5-diol can be synthesized by reacting acetylene with a ketone or an aldehyde corresponding to the aimed acetylene glycol, and may be produced, for example, by the method described in Takehiko Fujimoto, a fully revised edition "New Introduction to Surfactants" published by Sanyo Chemical Industries, Ltd., 1992, pp 94-107, etc.

Examples of the commercially available products of 2,4,7,9-tetramethyl-5-decyne-4,7-diol include "SURFYNOL 104" available from Nissin Chemical Industry Co., Ltd., and Air Products & Chemicals, Inc. In addition, examples of the commercially available products of EO adducts of 2,4,7,9-tetramethyl-5-decyne-4,7-diol include "SURFYNOL 420", "SURFYNOL 440", "SURFYNOL 465" all available from Nissin Chemical Industry Co., Ltd., and Air Products & Chemicals, Inc., etc.

[Method for Producing Water-Based Ink for Ink-Jet Printing]

The water-based ink for ink-jet printing according to the present invention may be produced by mixing the pigment (A), the water dispersion of the resin particles (B), the polypropylene glycol (X) and water, if required together with the acetylene glycol-based surfactant and the organic solvent (C) other than the polypropylene glycol (X), etc., and then stirring the obtained mixture.

The contents of the respective components in the water-based ink according to the present invention as well as and various properties of the water-based ink are as follows.

(Content of Pigment (A))

The content of the pigment (A) in the water-based ink is preferably not less than 1.0% by mass, more preferably not less than 2.0% by mass and even more preferably not less than 2.5% by mass, from the viewpoint of enhancing optical density of the water-based ink. Also, the content of the pigment (A) in the water-based ink is preferably not more than 15.0% by mass, more preferably not more than 10.0% by mass, even more preferably not more than 7.0% by mass and further even more preferably not more than 5.0% by mass, from the viewpoint of reducing viscosity of the ink upon evaporating the solvent therefrom and improving quick-drying fixing properties of the water-based ink when printed on a low-water absorbing recording medium as well as from the viewpoint of improving storage stability and ejection stability of the ink.

(Content of Resin Particles (B))

The content of the resin particles (B) in the water-based ink is preferably not less than 0.5% by mass, more preferably not less than 0.8% by mass and even more preferably not less than 1.0% by mass, and is also preferably not more than 5.0% by mass, more preferably not more than 4.0% by mass and even more preferably not more than 3.0% by mass, from the viewpoint of improving quick-drying fixing properties and long-term fixing properties of the water-based ink when printed on a low-water absorbing recording medium as well as from the viewpoint of improving storage stability and ejection stability of the ink. Furthermore, the content of the resin particles (B) in the water-based ink is further even more preferably not less than 1.5% by mass from the viewpoint of improving long-term fixing properties of the water-based ink, and is also further even more preferably not more than 2.5% by mass from the viewpoint of improving ejection stability of the ink.

(Mass Ratio of Pigment (A) to Resin Particles (B) [Pigment (A)/Resin Particles (B)])

The mass ratio of the resin particles (B) to the pigment (A) [pigment (A)/resin particles (B)] in the water-based ink is preferably not less than 100/300, more preferably not less than 100/200 and even more preferably not less than 100/150, and is also preferably not more than 100/10, more preferably not more than 100/20 and even more preferably not more than 100/30, from the viewpoint of promoting drying of printed characters or images and improving quick-drying fixing properties and optical density of the water-based ink when printed on a low-water absorbing recording medium.

(Total Content of Pigment (A) and Water-Insoluble Polymer (a))

The total content of the pigment (A) and the water-insoluble polymer (a) in the water-based ink is preferably not less than 2.0% by mass, more preferably not less than 2.5% by mass, even more preferably not less than 3.0% by mass and further even more preferably not less than 3.5% by mass, and is also preferably not more than 17.0% by mass, more preferably not more than 12.0% by mass, even more preferably not more than 10.0% by mass, further even more preferably not more than 8.0% by mass and still further even more preferably not more than 6.0% by mass.

(Content of Polypropylene Glycol (X))

The content of the polypropylene glycol (X) in the water-based ink is preferably not less than 0.1% by mass, more preferably not less than 0.3% by mass, even more preferably not less than 0.5% by mass and further even more preferably not less than 1% by mass, and is also preferably not more than 15% by mass, more preferably not more than 13% by mass, even more preferably not more than 10% by mass and further even more preferably not more than 8% by mass, from the viewpoint of enhancing ejection stability of the water-based ink.

(Total Content of Polypropylene Glycol Components Having Polymerization Degree of not Less than 5 and not More than 45)

The total content of the polypropylene glycol components having a polymerization degree of not less than 5 and not more than 45 which are contained in the polypropylene glycol (X), in the water-based ink is preferably not less than 0.2% by mass, more preferably not less than 0.3% by mass and even more preferably not less than 0.4% by mass, and is also preferably not more than 6% by mass, more preferably not more than 5% by mass, even more preferably not more than 4% by mass, further even more preferably not more than 3% by mass and still further even more preferably not more than 1.5% by mass, from the viewpoint of suppressing increase in viscosity of the water-based ink and improving ejection stability and storage stability of the ink.

(Mass Ratio of Resin Particles (B) to Polypropylene Glycol (X) [Resin Particles (B)/Polypropylene Glycol (X)])

The mass ratio of the resin particles (B) to the polypropylene glycol (X) [resin particles (B)/Polypropylene Glycol (X)] in the water-based ink is preferably not less than 0.2, more preferably not less than 0.5 and even more preferably not less than 1.0 from the viewpoint of improving long-term fixing properties of the water-based ink, and is also preferably not more than 40, more preferably not more than 10, even more preferably not more than 5.0 and further even more preferably not more than 3.0 from the viewpoint of improving ejection stability of the water-based ink.

(Content of Organic Solvent (C))

The content of the organic solvent (C) in the water-based ink is preferably not less than 5.0% by mass, more preferably not less than 10.0% by mass, even more preferably not less than 15.0% by mass and further even more preferably not less than 20.0% by mass, and is also preferably not more than 60.0% by mass, more preferably not more than 50.0% by mass, even more preferably not more than 40.0% by mass and further even more preferably not more than 30.0% by mass, from the viewpoint of improving ejection stability of the water-based ink.

(Content of Acetylene Glycol-Based Surfactant)

The content of the acetylene glycol-based surfactant in the water-based ink is preferably not less than 0.1% by mass, more preferably not less than 0.15% by mass and even more preferably not less than 0.2% by mass from the viewpoint of improving wetting spread of the water-based ink and enhancing image uniformity of printed characters or images when printed on a low-water absorbing recording medium, and is also preferably not more than 2% by mass, more preferably not more than 1.5% by mass, even more preferably not more than 1% by mass and further even more preferably not more than 0.5% by mass from the viewpoint of enhancing image uniformity of printed characters or images when printed on a low-water absorbing recording medium and improving ejection stability of the water-based ink.

(Content of Water)

The content of water in the water-based ink is preferably not less than 20% by mass, more preferably not less than 30% by mass and even more preferably not less than 40% by mass from the viewpoint of improving quick-drying fixing properties and long-term fixing properties of the water-based ink and image uniformity of printed characters or images when printed on a low-water absorbing recording medium, as well as from the viewpoint of improving ejection stability and storage stability of the water-based ink, and is also preferably not more than 80% by mass, more preferably not more than 75% by mass and even more preferably not more than 72% by mass from the viewpoint of improving ejection stability of the water-based ink.

[Other Components]

The water-based ink according to the present invention may also contain, in addition to the aforementioned components, various ordinary additives such as a humectant, a wetting agent, a penetrant, a dispersant, a surfactant other than the acetylene glycol-based surfactant, a viscosity controller, a defoaming agent, an antiseptic agent, a mildew-proof agent and a rust preventive.

[Properties of Water-Based Ink]

The viscosity of the water-based ink as measured at 32° C. is preferably not less than 2.0 mPa·s, more preferably not less than 3.0 mPa·s and even more preferably not less than 5.0 mPa·s from the viewpoint of improving ejection property of the water-based ink, and is also preferably not more than 12 mPa·s, more preferably not more than 9.0 mPa·s and even more preferably not more than 7.0 mPa·s from the viewpoint of improving storage stability and ejection stability of the water-based ink.

Meanwhile, the viscosity of the water-based ink at 32° C. may be measured by the method described in Examples below.

The pH value of the water-based ink is preferably not less than 7.0, more preferably not less than 8.0 and even more preferably not less than 8.5 from the viewpoint of attaining excellent spread of the dot size and improving fixing properties of the ink as well as image uniformity of printed characters or images when printed on a low-water absorbing recording medium, and from the viewpoint of improving storage stability and ejection stability of the ink, and is also preferably not more than 11.0, more preferably not more than 10.0 and even more preferably 9.5 from the viewpoint of improving resistance of members to the water-based ink and suppressing skin irritation.

Meanwhile, the pH value of the water-based ink may be measured by the method described in Examples below.

[Ink-Jet Printing Method]

The ink-jet printing method according to the present invention is a method of printing characters or images on a recording medium using a water-based ink for ink-jet printing, in which the recording medium has a water absorption of not more than 10 g/m$^2$ and not less than 0 g/m$^2$ as measured in a pure water contact time of 100 milliseconds; the water-based ink includes the pigment (A), the resin particles (B), the polypropylene glycol (X) and water; and the resin particles (B) are produced by emulsion polymerization method.

The ink-jet printing method according to the present invention is an image forming method including the steps of mounting a container filled with the aforementioned water-based ink for ink-jet printing to an ink-jet printing apparatus equipped with an ink ejecting means; and ejecting the ink onto the aforementioned ink-jet recording medium.

The ink-jet printing method according to the present invention may further include the step of drying characters or images printed on the ink-jet recording medium after printing the characters or images thereon.

In the aforementioned ink-jet printing method, a thermal-type or piezoelectric-type ink-jet print head may be used as the ink ejecting means for ejecting the water-based ink to the ink-jet recording medium. In the present invention, there is preferably used the method of ejecting the water-based ink to the ink-jet recording medium using a piezoelectric-type ink-jet print head to print the characters or images thereon.

<Ink-Jet Recording Medium>

The low-water absorbing recording medium used in the ink-jet printing method according to the present invention has the following water absorption.

The water absorption of the ink-jet recording medium as measured in a pure water contact time of 100 milliseconds is not more than 10 g/m$^2$ and not less than 0 g/m$^2$.

The ink-jet recording medium used in the present invention may be a coated paper or a film.

In addition, the water absorption of the coated paper when used as the ink-jet recording medium as measured in a pure water contact time of 100 milliseconds is preferably not more than 8.0 g/m$^2$, more preferably not more than 7.0 g/m$^2$, even more preferably not more than 6.0 g/m$^2$ and further even more preferably not more than 5.5 g/m$^2$ from the viewpoint of improving image uniformity of printed characters or images and enhancing optical density and gloss of the water-based ink, and is also preferably not less than 1.0 g/m$^2$, more preferably not less than 2.0 g/m$^2$, even more preferably not less than 3.0 g/m$^2$ and further even more preferably not less than 4.0 g/m$^2$ from the viewpoint of promoting drying of printed characters or images and improving quick-drying fixing properties and long-term fixing properties of the water-based ink as well as image uniformity of printed characters or images.

Also, the water absorption of the film when used as the ink-jet recording medium as measured in a pure water contact time of 100 milliseconds is preferably not more than 5.0 g/m$^2$ and more preferably not more than 3.0 g/m$^2$ from the viewpoint of improving image uniformity of printed characters or images and enhancing optical density and gloss of the water-based ink, and is also preferably not less than 0.1 g/m$^2$, more preferably not less than 0.5 g/m$^2$ and even more preferably not less than 1.0 g/m$^2$ from the viewpoint of promoting drying of printed characters or images and improving quick-drying fixing properties and long-term fixing properties of the water-based ink as well as image uniformity of printed characters or images.

Meanwhile, the water absorption of the ink-jet recording medium as measured in a pure water contact time of 100 milliseconds may be measured by the method described in Examples below. The 60° gloss of the recording medium is preferably not less than 5, more preferably not less than 20 and even more preferably not less than 30, and is also preferably not more than 200, from the viewpoint of enhancing gloss and visibility of printed characters or images. The 60° gloss of the recording medium may be measured by a gloss meter "HANDY GLOSSMETER, Model No.: PG-1M" available from Nippon Denshoku Industries Co., Ltd.

Examples of the coated paper include "OK Topcoat+" (basis weight: 104.7 g/m$^2$; 60° gloss: 49.0; water absorption as measured in a pure water contact time of 100 milliseconds (hereinafter defined in the same way): 4.9 g/m$^2$) available from Oji Paper Co., Ltd., a multi-color foam glossy coated paper (basis weight: 104.7 g/m$^2$; 60° gloss: 36.8; water absorption: 5.2 g/m$^2$) available from Oji Paper Co., Ltd., "UPM Finesse Gloss" (basis weight: 115 g/m$^2$; 60° gloss: 27.0; water absorption: 3.1 g/m$^2$) available from UPM, "UPM Finesse Matt" (basis weight: 115 g/m$^2$; 60° gloss: 5.6; water absorption: 4.4 g/m$^2$) available from UPM, "TerraPress Silk" (basis weight: 80 g/m$^2$; 60° gloss: 6.0; water absorption: 4.1 g/m$^2$) available from Stora Enso, and "Lumi-Art" (basis weight: 90 g/m$^2$; 60° gloss: 26.3) available from Stora Enso.

Examples of the film include a polyester film, a vinyl chloride film, a polypropylene film, a polyethylene film and a nylon film. These films may be subjected to surface treatments such as corona treatment, etc., if required.

Examples of the generally available films include "LUMIRROR T60" (polyethylene terephthalate; thickness: 125 μm; 60° gloss: 189.1; water absorption: 2.3 g/m$^2$) available from Toray Industries Inc., "PVC80B P" (polyvinyl chloride; 60° gloss: 58.8; water absorption: 1.4 g/m$^2$) available from Lintec Corporation, "KINATH KEE 70CA" (polyethylene) available from Lintec Corporation, "YUPO SG90 PATI" (polypropylene) available from Lintec Corporation, and "BONYL RX" (nylon) available from Kohjin Film & Chemicals Co., Ltd.

With respect to the aforementioned embodiments, the present invention further provides the following aspects relating to the water-based ink for ink-jet printing and the ink-jet printing method.

<1> An ink-jet printing method of printing characters or images on a recording medium using a water-based ink for ink-jet printing, in which the recording medium has a water absorption of not more than 10 g/m$^2$ and not less than 0 g/m$^2$ as measured in a pure water contact time of 100 milliseconds;

the water-based ink includes a pigment (A), resin particles (B), a polypropylene glycol (X) and water; and the resin particles (B) are produced by emulsion polymerization method.

<2> The ink-jet printing method according to the aspect <1>, wherein an average polymerization degree of the polypropylene glycol (X) is preferably not less than 5 and more preferably not less than 6, and is also preferably not more than 45, more preferably not more than 40, even more preferably not more than and further even more preferably not more than 30.

<3> The ink-jet printing method according to the aspect <1> or <2>, wherein a total content of polypropylene glycol components having a polymerization degree of not less than 5 and not more than 45 which are contained in the polypropylene glycol (X), in the water-based ink is preferably not less than 0.2% by mass, more preferably not less than 0.3% by mass and even more preferably not less than 0.4% by mass, and is also preferably not more than 6% by mass, more preferably not more than 5% by mass, even more preferably not more than 4% by mass, further even more preferably not more than 3% by mass and still further even more preferably not more than 1.5% by mass.

<4> The ink-jet printing method according to any one of the aspects <1> to <3>, wherein an average molecular weight of the polypropylene glycol (X) is preferably not less than 250, more preferably not less than 300, even more preferably not less than 400 and further even more preferably not less than 600, and is also preferably not more than 3500, more preferably not more than 3000, even more preferably not more than 2500, further even more preferably not more than 2000 and still further even more preferably not more than 1500.

<5> The ink-jet printing method according to any one of the aspects <1> to <4>, wherein a mass ratio of the resin particles (B) to the polypropylene glycol (X) [resin particles (B)/polypropylene glycol (X)] in the water-based ink is preferably not less than 0.2, more preferably not less than 0.5 and even more preferably not less than 1.0, and is also preferably not more than 40, more preferably not more than 10, even more preferably not more than 5.0 and further even more preferably not more than 3.0.

<6> The ink-jet printing method according to any one of the aspects <1> to <5>, wherein the water-based ink further includes an acetylene glycol-based surfactant.

<7> The ink-jet printing method according to the aspect <6>, wherein the acetylene glycol-based surfactant is in the form of a compound having an average molar number of addition of ethyleneoxide of preferably not more than 5 and more preferably not more than 3, and even more preferably in the form of a compound to which no EO is added.

<8> The ink-jet printing method according to the aspect <6> or <7>, wherein the acetylene glycol-based surfactant is preferably at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol, 2,5,8,11-tetramethyl-6-decyne-5,8-diol, 3,5-dimethyl-1-hexyne-3-ol and EO adducts of these compounds, more preferably at least one compound selected from the group consisting of 2,4,7,9-tetramethyl-5-decyne-4,7-diol, 3,6-dimethyl-4-octyne-3,6-diol and 2,5-dimethyl-3-hexyne-2,5-diol, and even more preferably 2,4,7,9-tetramethyl-5-decyne-4,7-diol.

<9> The ink-jet printing method according to any one of the aspects <6> to <8>, wherein a content of the acetylene glycol-based surfactant in the water-based ink is preferably not less than 0.1% by mass, more preferably not less than 0.15% by mass and even more preferably not less than 0.2% by mass, and is also preferably not more than 2% by mass, more preferably not more than 1.5% by mass, even more preferably not more than 1% by mass and further even more preferably not more than 0.5% by mass.

<10> The ink-jet printing method according to any one of the aspects <1> to <9>, wherein the resin particles (B) are preferably in the form of particles constituted of an acrylic resin, and more preferably acrylic resin particles including a (meth)acrylic acid-based copolymer containing a constitutional unit derived from (meth)acrylic acid and a constitutional unit derived from a (meth)acrylic acid ester.

<11> The ink-jet printing method according to the aspect <10>, wherein a weight-average molecular weight of the resin particles (B) is preferably not less than 70,000, more preferably not less than 100,000, even more preferably not less than 150,000 and further even more preferably not less than 200,000, and is also preferably not more than 1,200,000, more preferably not more than 1,100,000, even more preferably not more than 1,000,000 and further even more preferably not more than 900,000.

<12> The ink-jet printing method according to any one of the aspects <1> to <11>, wherein a content of the resin particles (B) in the water-based ink is preferably not less than 0.5% by mass, more preferably not less than 0.8% by mass, even more preferably not less than 1.0% by mass and further even more preferably not less than 1.5% by mass, and is also preferably not more than 5.0% by mass, more preferably not more than 4.0% by mass, even more preferably not more than 3.0% by mass and further even more preferably not more than 2.5% by mass.

<13> The ink-jet printing method according to any one of the aspects <1> to <12>, wherein a content of the pigment (A) in the water-based ink is preferably not less than 1.0% by mass, more preferably not less than 2.0% by mass and even more preferably not less than 2.5% by mass, and is also preferably not more than 15.0% by mass, more preferably not more than 10.0% by mass, even more preferably not more than 7.0% by mass and further even more preferably not more than 5.0% by mass.

<14> The ink-jet printing method according to any one of the aspects <1> to <13>, wherein a mass ratio of the resin particles (B) to the pigment (A) [pigment (A)/resin particles (B)] in the water-based ink is preferably not less than 100/300, more preferably not less than 100/200 and even more preferably not less than 100/150, and is also preferably not more than 100/10, more preferably not more than 100/20 and even more preferably not more than 100/30.

<15> The ink-jet printing method according to any one of the aspects <1> to <14>, wherein the pigment (A) is included in the water-based ink in the form of pigment-containing water-insoluble polymer (a) particles.

<16> The ink-jet printing method according to the aspect <15>, wherein a total content of the pigment (A) and the water-insoluble polymer (a) in the water-based ink is preferably not less than 2.0% by mass, more preferably not less than 2.5% by mass, even more preferably not less than 3.0% by mass and further even more preferably not less than 3.5% by mass, and is also preferably not more than 17.0% by mass, more preferably not more than 12.0% by mass, even more preferably not more than 10.0% by mass, further even more preferably not more than 8.0% by mass and still further even more preferably not more than 6.0% by mass.

<17> The ink-jet printing method according to the aspect <15> or <16>, wherein the water-insoluble polymer (a) contains a constitutional unit derived from (a-1) an ionic monomer and a constitutional unit derived from (a-2) a hydrophobic monomer.

<18> The ink-jet printing method according to any one of the aspects <1> to <17>, wherein the water-based ink further contains at least one organic solvent (C) other than the polypropylene glycol (X) which has a boiling point of not lower than 90° C., in which a weighted mean value of the boiling point of the organic solvent (C) which is weighted by contents (% by mass) of respective organic solvents in the organic solvent (C) is preferably not lower than 150° C. and more preferably not lower than 180° C., and is also preferably not higher than 260° C., more preferably not higher than 230° C., even more preferably not higher than 220° C. and further even more preferably not higher than 210° C.

<19> The ink-jet printing method according to the aspect <18>, wherein the organic solvent (C) preferably is a combination of two or more kinds of polyhydric alcohols, a combination of two or more kinds of polyhydric alcohol alkyl ethers or a combination of at least one polyhydric alcohol and at least one polyhydric alcohol alkyl ether, more preferably a combination of two or more kinds of polyhydric alcohols or a combination of at least one polyhydric alcohol and at least one polyhydric alcohol alkyl ether, and even more preferably a combination of at least one compound selected from the group consisting of propylene glycol and diethylene glycol, and glycerin.

<20> The ink-jet printing method according to the aspect <19>, wherein a mass ratio of an organic solvent (Y) including at least one compound selected from the group consisting of propylene glycol and diethylene glycol to glycerin [organic solvent (Y)/glycerin] is preferably not less than 0.5, more preferably not less than 1.0 and even more preferably not less than 1.5, and is also preferably not more than 15, more preferably not more than 10 and even more preferably not more than 5.

<21> The ink-jet printing method according to any one of the aspects <18> to <20>, wherein a content of the organic solvent (C) in the water-based ink is preferably not less than 5.0% by mass, more preferably not less than 10.0% by mass, even more preferably not less than 15.0% by mass and further even more preferably not less than 20.0% by mass, and is also preferably not more than 60.0% by mass, more preferably not more than 50.0% by mass, even more preferably not more than 40.0% by mass and further even more preferably not more than 30.0% by mass.

<22> The ink-jet printing method according to any one of the aspects <1> to <21>, wherein the recording medium is a coated paper or a film.

<23> The ink-jet printing method according to the aspect <22>, wherein a water absorption of the coated paper is preferably not more than 8.0 g/m$^2$, more preferably not more than 7.0 g/m$^2$, even more preferably not more than 6.0 g/m$^2$ and further even more preferably not more than 5.5 g/m$^2$, and is also preferably not less than 1.0 g/m$^2$, more preferably not less than 2.0 g/m$^2$, even more preferably not less than 3.0 g/m$^2$ and further even more preferably not less than 4.0 g/m$^2$.

<24> The ink-jet printing method according to the aspect <23>, wherein a water absorption of the film is preferably not more than 5.0 g/m$^2$ and more preferably not more than 3.0 g/m$^2$, and is also preferably not less than 0.1 g/m$^2$, more preferably not less than 0.5 g/m$^2$ and even more preferably not less than 1.0 g/m$^2$.

<25> A water-based ink for ink-jet printing including a pigment (A), resin particles (B), a polypropylene glycol (X) and water, in which the resin particles (B) are produced by emulsion polymerization method.

<26> The water-based ink for ink-jet printing according to the aspect <25>, wherein a mass ratio of the resin particles (B) to the polypropylene glycol (X) [resin particles (B)/polypropylene glycol (X)] in the water-based ink is preferably not less than 0.2, more preferably not less than 0.5 and even more preferably not less than 1.0, and is also preferably not more than 40, more preferably not more than 10, even more preferably not more than 5.0 and further even more preferably not more than 3.0.

<27> A process for producing a water-based ink for ink-jet printing, including the step of mixing a pigment (A), resin particles (B), a polypropylene glycol (X) and water, in which the resin particles (B) are produced by emulsion polymerization method.

<28> A use of the water-based ink for ink-jet printing according to the aspect <25> or <26> for printing characters or images on a recording medium having a water absorption of not more than 10 g/m$^2$ and not less than 0 g/m$^2$ as measured in a pure water contact time of 100 milliseconds.

EXAMPLES

In the following Production Examples, Examples and Comparative Examples, the "part(s)" and "%" indicate "part(s) by mass" and "% by mass", respectively, unless otherwise specified.

(1) Measurement of Polymerization Degree and Calculation of Average Molecular Weight The measurement of polymerization degrees of respective components of polypropylene glycol and polyethylene glycol and calculation of average molecular weights thereof were conducted by the following methods using liquid chromatography.

(1-1) Calculation of Compositional Ratios of Respective Components

Polypropylene glycol or polyethylene glycol was dissolved in a mixed solution containing water and acetonitrile to obtain a solution containing polypropylene glycol or polyethylene glycol in an amount of 0.1%, and the resulting solution was measured by LC-CAD method [using a liquid chromatographic apparatus available from Shimadzu Corporation equipped with a column "L-Column ODS C18" (4.6×250 mm, 5 µm); column temperature: 25° C.; amount of sample injected: 20 µL; detector: CAD] to calculate compositional ratios of the respective components in the polypropylene glycol or polyethylene glycol. In this case, the proportion of the acetonitrile solution in the eluent was varied to enhance resolution of a peak of the respective compositional ratios.

(1-2) Identification of Polymerization Degrees of Respective Components

Polypropylene glycol or polyethylene glycol was dissolved in a mixed solution containing water and acetonitrile to obtain a solution containing polypropylene glycol or polyethylene glycol in an amount of 0.01%, and the resulting solution was measured by LC-MS method [using a liquid chromatographic apparatus available from Agilent Technologies Inc., equipped with a column "L-Column ODS C18" (4.6×250 mm, 5 µm); column temperature: 25° C.; amount of sample injected: 20 µL; ionizing solvent: 10 mM ammonium nitrate/methanol; detector: ESI-MS] to determine polymerization degrees of the respective components in the polypropylene glycol or polyethylene glycol from masses thereof at peaks of the respective compositional ratios.

(1-3) Calculation of Average Molecular Weight

Assuming that the molecular weight of the repeating unit of the polypropylene glycol was 58, the average molecular weight of the polypropylene glycol was calculated from ratios of the respective components present therein which were obtained from the aforementioned calculation of the compositional ratios of the respective components and the aforementioned identification of polymerization degrees of the respective components according to the following calculation formula.

Average Molecular Weight=$\{\Sigma[(\text{respective polymerization degrees}\times 58)\times(\text{mass ratios of respective components present in polypropylene glycol (\%)})]\}/100\%$ In addition, the average molecular weight of the polyethylene glycol was calculated by using the value of 44 as a molecular weight of a repeating unit of the polyethylene glycol in place of 58 used in the above formula.

(2) Contents of Polypropylene Glycol Components Having Polymerization Degree of not Less than 5 and not More than 45

The contents of polypropylene glycol components having a polymerization degree of not less than 5 and not more than 45 were calculated from the ratios of the respective components present therein which were obtained in the aforementioned items (1-1) and (1-2).

(3) Measurement of Weight-Average Molecular Weights of Water-Insoluble Polymer and Resin Particles The weight-average molecular weight of the water-insoluble polymer or resin particles was measured by gel permeation chromatography [GPC apparatus: "HLC-8120GPC" available from Tosoh Corporation; column: "TSK-GEL, α-M"×2 available from Tosoh Corporation; flow rate: 1 mL/min)] using N,N-dimethyl formamide in which phosphoric acid and lithium bromide were dissolved in amounts of 60 mmol/L and 50 mmol/L, respectively, as an eluent, and using a monodisperse polystyrene having a known molecular weight as a reference standard substance.

(4) Measurement of Average Particle Sizes of Pigment-Containing Polymer Particles and Resin Particles The particles were subjected to cumulant analysis using a laser particle analyzing system "ELS-8000" available from Otsuka Electrics Co., Ltd., to measure an average particle size thereof. The measurement was conducted under the conditions including a temperature of 25° C., an angle between incident light and detector of 90° and a cumulative number of 100 times, and a refractive index of water (1.333) was input to the analyzing system as a refractive index of the dispersing medium. Further, the measurement was conducted by adjusting a concentration of the dispersion to be measured to $5\times 10^{-3}$% by mass in terms of a solid content thereof.

(5) Measurement of Solid Content of Water Dispersion

Sodium sulfate dried to constant weight in a desiccator was weighed in an amount of 10.0 g and charged in a 30 mL polypropylene reaction vessel ($\phi$: 40 mm; height: 30 mm), and about 1.0 g of a sample was added to the reaction vessel. The contents of the reaction vessel were mixed and then accurately weighed. The resulting mixture was maintained in the reaction vessel at 105° C. for 2 hours to remove volatile components therefrom and further allowed to stand in a desiccator for 15 minutes to measure a mass thereof. The mass of the sample after removing the volatile components therefrom, was regarded as a mass of solids therein. The solid content of the sample was calculated by dividing the mass of the solids by the mass of the sample added.

(6) pH of Water-Based Ink

The pH value of the water-based ink at 25° C. was measured using a bench-top pH meter "F-71" available from Horiba Ltd., equipped with a pH electrode "6337-10 D" available from Horiba Ltd.

(7) Viscosity of Water-Based Ink

The viscosity of the water-based ink was measured at 32° C. using an E-type viscometer "TV-25" (equipped with a standard cone rotor (1° 34'× R24); rotating speed: 50 rpm) available from Toki Sangyo Co., Ltd.

(8) Water Absorption of Recording Medium

The water absorption of the recording medium as measured by contacting the recording medium with pure water for 100 milliseconds was determined as follows. That is, using an automatic scanning absorptometer "KM500win" available from Kumagai Riki Kogyo Co., Ltd., an amount of pure water transferred to the recording medium when allowing the recording medium to contact with pure water for 100 milliseconds was measured at 23° C. under a relative humidity of 50% RH. The thus measured amount of pure water transferred to the recording medium was determined as the water absorption of the recording medium as measured in a pure water contact time of 100 milliseconds. The measuring conditions are as follows.

"Spiral Method"

Contact time: 0.010 to 1.0 (sec)
Pitch (mm): 7
Length Per Sampling (degree): 86.29
Start Radius (mm): 20

End Radius (mm): 60
Min Contact Time (millisecond): 10
Max Contact Time (millisecond): 1000
Sampling Pattern (1-50): 50
Number of Sampling Points (>0): 19
"Square Head"
Split Span (mm): 1
Split Width (mm): 5

Production Example 1 (Production of Water Dispersion of Pigment-Containing Polymer Particles)

(1) Synthesis of Water-Insoluble Polymer (a1)

Fourteen (14) parts of methacrylic acid available from Wako Pure Chemical Industries, Ltd., 46 parts of styrene available from Wako Pure Chemical Industries, Ltd., 30 parts of a styrene macromonomer "AS-6S" (molecular weight: 6,000; solid content: 50%) available from Toagosei Co., Ltd., parts of polypropylene glycol methacrylate "BLEMMER PP-1000" available from NOF Corporation, and 25 parts of methyl ethyl ketone were mixed to prepare 140 parts of a monomer mixture solution.

Eighteen (18) parts of methyl ethyl ketone and 0.03 part of 2-mercaptoethanol as a chain transfer agent as well as 10% (14 parts) of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% (126 parts) of the monomer mixture solution, 0.27 part of the above chain transfer agent, 42 parts of methyl ethyl ketone and 3 parts of 2,2'-azobis(2,4-dimethylvaleronitrile) "V-65" as a polymerization initiator available from Wako Pure Chemical Industries, Ltd., was charged into a dropping funnel. In a nitrogen atmosphere, the mixed solution in the reaction vessel was heated to 75° C. while stirring, and then the mixed solution in the dropping funnel was added dropwise thereinto over 3 hours. After the elapse of 2 hours from completion of the dropwise addition while maintaining the resulting mixed solution at a temperature of 75° C., a solution prepared by dissolving 3 parts of the aforementioned polymerization initiator in 5 parts of methyl ethyl ketone was added to the mixed solution, and the resulting reaction solution was further aged at 75° C. for 2 hours and at 80° C. for 2 hours to obtain a solution of a water-insoluble polymer (a1) (having a weight-average molecular weight of 60,000). The solid content of the thus obtained water-insoluble polymer solution was 60% by mass.

(2) Production of Water Dispersion of Pigment-Containing Polymer Particles

Forty four (44) parts of the water-insoluble polymer (a1) produced by drying the water-insoluble polymer solution obtained in the above (1) under reduced pressure were dissolved in 148 parts of methyl ethyl ketone. Added into the resulting solution were 12.5 parts of a 5N sodium hydroxide aqueous solution and 2 parts of a 25% ammonia aqueous solution both acting as a neutralizing agent. Further, 372 parts of ion-exchanged water and then 100 parts of a cyan pigment "PB-15:3" available from Dainichiseika Color & Chemicals Mfg. Co., Ltd., were added to the resulting mixed solution to prepare a pigment mixture solution. The degree of neutralization of the pigment mixture solution was 100 mol %. The thus obtained pigment mixture solution was mixed at 20° C. for 1 hour using a disper blade at 7000 rpm. The resulting dispersion was dispersed under a pressure of 180 MPa using a Microfluidizer "High-Pressure Homogenizer M-140K" available from Microfluidics Corporation by passing the dispersion through the device 15 times.

The thus obtained dispersion of the water-insoluble polymer particles was held at 60° C. under reduced pressure to remove methyl ethyl ketone therefrom, followed by further removing a part of water therefrom. The resulting dispersion was subjected to centrifugal separation, and a liquid layer portion separated therefrom was filtered through a filter "Minisart Syringe Filter" (pore diameter: 5 µm; material: acetyl cellulose) available from Sartorius Inc., to remove coarse particles therefrom, thereby obtaining a water dispersion of pigment-containing polymer particles. The solid content of the water dispersion was 20% by mass, and the average particle size of the pigment-containing polymer particles was 100 nm.

Production Example 2 (Production of Water Dispersion of Resin Particles (b1))

A 1000 mL separable flask was charged with 145 parts of methyl methacrylate available from Wako Pure Chemical Industries, Ltd., 50 parts of 2-ethylhexyl acrylate available from Wako Pure Chemical Industries, Ltd., 5 parts of methacrylic acid available from Wako Pure Chemical Industries, Ltd., 18.5 parts of a sodium polyoxyethylene (18) lauryl ether sulfate aqueous solution "LATEMUL E-118B" (tradename; solid content: 26%) available from Kao Corporation, 96 parts of ion-exchanged water and 0.4 part of potassium persulfate available from Wako Pure Chemical Industries, Ltd., and the contents of the separable flask were stirred using a stirring blade (at 300 rpm), thereby obtaining a monomer emulsion.

A reaction vessel was charged with 4.6 parts of "LATEMUL E-118B", 186 parts of ion-exchanged water and 0.08 part of potassium persulfate, and an inside atmosphere of the reaction vessel was fully replaced with a nitrogen gas. The contents of the reaction vessel were heated to 80° C. while stirring using a stirring blade (at 200 rpm) in a nitrogen atmosphere. Then, the aforementioned monomer emulsion was charged into a dropping funnel and added dropwise therefrom to the reaction vessel over 3 hours to react with the contents of the reaction vessel. The resulting reaction solution was mixed with ion-exchanged water to adjust a concentration of the active ingredient therein to 20%, thereby obtaining a water dispersion of resin particles (b1) (weight-average molecular weight: 500,000). The average particle size of the resin particles (b1) was 115 nm.

Production Example 3 (Production of Water Dispersion of Resin Particles (b2))

A 1000 mL separable flask was charged with 145 parts of methyl methacrylate available from Wako Pure Chemical Industries, Ltd., 50 parts of 2-ethylhexyl acrylate available from Wako Pure Chemical Industries, Ltd., 5 parts of methacrylic acid available from Wako Pure Chemical Industries, Ltd., 18.5 parts of a sodium polyoxyethylene (18) lauryl ether sulfate aqueous solution "LATEMUL E-118B" (tradename; solid content: 26%) available from Kao Corporation, 96 parts of ion-exchanged water and 0.4 part of potassium persulfate available from Wako Pure Chemical Industries, Ltd., and the contents of the separable flask were stirred using a stirring blade (at 300 rpm), thereby obtaining a monomer emulsion.

A reaction vessel was charged with 4.6 parts of "LATEMUL E-118B", 186 parts of ion-exchanged water and 0.08 part of potassium persulfate, and an inside atmosphere of the reaction vessel was fully replaced with a nitrogen gas. The contents of the reaction vessel were heated to 80° C. while stirring using a stirring blade (at 200 rpm) in a nitrogen atmosphere. Then, the aforementioned monomer emulsion was charged into a dropping funnel and added dropwise therefrom to the reaction vessel over 3 hours to react with the contents of the reaction vessel. The resulting reaction solution was mixed with ion-exchanged water to adjust a concentration of the active ingredient therein to 20%, thereby obtaining a water dispersion of resin particles (b2) (weight-average molecular weight: 100,000). The average particle size of the resin particles (b2) was 100 nm.

Comparative Production Example 1 (Production of Water-Insoluble Polymer (c1))

"JONCRYL 61J" available from BASF was diluted with ion-exchanged water to adjust a concentration of the active ingredient in the obtained diluted solution to 20%, thereby obtaining a water-soluble resin dispersion (weight-average molecular weight: 12,000).

Example 1 (Production of Water-Based Ink)

Ion-exchanged water was added to and mixed with a mixture including 21.5 parts of the water dispersion of the pigment-containing polymer particles (solid content: 20% by mass; pigment: 3.0 parts; water-insoluble polymer (a1): 1.3 parts) obtained in Production Example 1, 9 parts of the water dispersion of the resin particles (31) (solid content: 20% by mass; resin particles (p& 1.8 parts) obtained in Production Example 2, 1 part of "Polypropylene Glycol 1000" (content of polypropylene glycol components having a polymerization degree of not less than 5 and not more than 45: 100%; average molecular weight: 1028) available from Wako Pure Chemical Industries, Ltd., 5 parts of glycerin, 20 parts of propylene glycol and 0.5 part of an acetylene glycol-based surfactant "SURFYNOL 104" (tradename) available from Air Products and Chemicals, Inc., to adjust a total volume of the resulting mixed solution to 100 parts. The thus obtained mixed solution was filtered through a filter "Minisart Syringe Filter" (pore diameter: 1.2 µm; material: acetyl cellulose) available from Sartorius Inc., to prepare a water-based ink having a pH value of 8.8.

Examples 2 to 20 and Comparative Examples 1 to 4 (Production of Water-Based Inks)

The same procedure as in Example 1 was repeated except for using the respective compositions shown in Tables 1 and 2, thereby obtaining water-based inks.

Meanwhile, the details of the polypropylene glycols, the acetylene glycol-based surfactants, etc., used in these Examples, etc., are as follows.

[Polypropylene Glycols: Available from Wako Pure Chemical Industries, Ltd.]

PPG400: "Polypropylene Glycol 400" (diol-type; content of polypropylene glycol components having a polymerization degree of not less than 5 and not more than 45: 100%; average molecular weight: 459)

PPG700: "Polypropylene Glycol 700" (diol-type; content of polypropylene glycol components having a polymerization degree of not less than 5 and not more than 45: 100%; average molecular weight: 675)

PPG1000: "Polypropylene Glycol 1000" (diol-type; content of polypropylene glycol components having a polymerization degree of not less than 5 and not more than 45: 100%; average molecular weight: 1028)

PPG2000: "Polypropylene Glycol 2000" (diol-type; content of polypropylene glycol components having a polymerization degree of not less than 5 and not more than 45: 95%; average molecular weight: 2083)

PPG3000: "Polypropylene Glycol 3000" (diol-type; content of polypropylene glycol components having a polymerization degree of not less than 5 and not more than 45: 50%; average molecular weight: 3221)

[Acetylene Glycol-Based Surfactants: Available from Air Products and Chemicals, Inc.]

"SURFYNOL 104" (2,4,7,9-tetramethyl-5-decyne-4,7-diol)

"SURFYNOL 420" (ethyleneoxide (20%) adduct of "SURFYNOL 104")

"SURFYNOL 465" (ethyleneoxide (65%) adduct of "SURFYNOL 104")

[Others]

PEG1000: "Polyethylene Glycol 1000" (available from Wako Pure Chemical Industries, Ltd.; content of polypropylene glycol components having a polymerization degree of not less than 5 and not more than 45: 0%; average molecular weight: 976)

"KF-354L" (Modified Silicone; Available from Shin-Etsu Chemical Industry Co., Ltd.)

<Evaluation Tests of Water-Based Ink>

(Preparation of Ink-Jet Printed Materials)

The water-based ink produced in the respective Examples and Comparative Examples was loaded to a printing evaluation apparatus available from Trytech Co., Ltd., equipped with an ink-jet print head "KJ4B-HD06MHG-STDV" available from Kyocera Corporation under the environmental conditions of a temperature of 25±1° C. and a relative humidity of 30±5%.

The operating conditions of the apparatus were set to a head voltage of 26 V, a frequency of 30 kHz, an ejected ink droplet amount of 12 pL, a head temperature of 32° C., a resolution of 600 dpi, a number of ink shots for flashing before ejection of 200 shots, and a negative pressure of −4.0 kPa.

The recording medium (1) "OK Topcoat+" (A4 size; water absorption: 4.9 g/m$^2$) available from Oji Paper Co., Ltd., or the recording medium (2) "UPM Finesse Gloss" (water absorption: 3.1 g/m$^2$) available from UPM, was fixed on a transporting table under reduced pressure such that a length direction of the recording medium was aligned with a transporting direction thereof.

A printing command was transmitted to the printing evaluation apparatus to print a solid image of Duty 100% (12 pL; 600×600 dpi) on the recording medium by an ink-jet printing method using the water-based ink, thereby obtaining printed materials. The thus obtained printed materials were subjected to the following evaluation tests 1 to 4.

Test 1 (Ejection Stability)

After preparing the respective ink-jet printed materials, operation of the ink-jet printer used was stopped for 30 minutes, and a print head thereof was exposed to atmospheric air. After the elapse of 30 minutes from the stopping, the printing operation of the ink-jet printer was restarted to observe the condition of ejection of the ink upon preparing a first sheet of the solid image-printed material. The ejection recovery rate (%) was calculated according to the following formula to evaluate ejection stability of the ink.

Ejection Recovery Rate (%)=(Ejection Area of Solid Image Printing After Exposure to Atmospheric Air for 30 minutes)/(Ejection Area of Solid Image Printing Before Test)×100

The larger the ejection recovery rate (%) becomes, the more excellent the ejection stability of the water-based ink is.

Test 2 (Quick-Drying Fixing Properties)

The printed material prepared in the above item "Preparation of Ink-Jet Printed Materials" was rubbed with hands after the elapse of each of 10 seconds, seconds and 30 seconds from the printing to examine quick-drying fixing properties of the ink. The ink having the following evaluation rating A, B or C can be practically used.

(Evaluation Ratings)

A: The solid image printing portion was free from peeling-off of a printed surface thereof even when contacting therewith after the elapse of 10 seconds from the printing.

B: The solid image printing portion was free from peeling-off of a printed surface thereof even when contacting therewith after the elapse of 20 seconds from the printing.

C: The solid image printing portion was free from peeling-off of a printed surface thereof even when contacting therewith after the elapse of 30 seconds from the printing.

D: The solid image printing portion suffered from peeling-off of a printed surface thereof when contacting therewith after the elapse of 30 seconds from the printing.

Test 3 (Long-Term Fixing Properties)

The printed material prepared in the above item "Preparation of Ink-Jet Printed Materials" was allowed to stand at room temperature (25° C.) for 1 day, and then the solid image printing portion thereof was rubbed with a urethane pad having a load of 500 g or a load of 250 g 20 times. The thus rubbed solid image printing portion was observed by naked eyes to evaluate long-term fixing properties of the ink.

(Evaluation Ratings)

A: Even in the case where the solid image printing portion was rubbed with a urethane pad having a load of 500 g 20 times, no peeling-off occurred when observed by naked eyes.

B: In the case where the solid image printing portion was rubbed with a urethane pad having a load of 500 g 20 times, peeling-off occurred within 50% of the printed surface when observed by naked eyes.

C: In the case where the solid image printing portion was rubbed with a urethane pad having a load of 500 g 20 times, peeling-off occurred in more than 50% of the printed surface when observed by naked eyes, whereas in the case where the solid image printing portion was rubbed with a urethane pad having a load of 250 g 20 times, peeling-off occurred within 50% of the printed surface when observed by naked eyes.

D: In the case where the solid image printing portion was rubbed with a urethane pad having a load of 250 g 20 times, peeling-off occurred in more than 50% of the printed surface when observed by naked eyes.

Test 4 (Image Uniformity)

The solid image printing portion of the ink-jet printed material obtained in the above item "Preparation of Ink-Jet Printed Materials" was observed by naked eyes to evaluate image uniformity thereof.

(Evaluation Ratings)

A: The solid image printing portion was free from deterioration in image quality such as white streaks and color unevenness (liquid overflow).

B: The solid image printing portion was inhibited from suffering from deterioration in image quality such as white streaks and color unevenness (liquid overflow) in not less than 2% of a whole printed surface thereof.

C: The solid image printing portion suffered from deterioration in image quality such as white streaks and color unevenness (liquid overflow) in not less than 2% and not more than 5% of a whole printed surface thereof.

D: The solid image printing portion suffered from deterioration in image quality such as white streaks and color unevenness (liquid overflow) in more than 5% of a whole printed surface thereof.

TABLE 1

|  |  | Examples |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Component (A) (part(s)) | Pigment (PB15:3) | 3.0 | 3.0 | 3.0 | 3.0 | 3.0 | 3.0 | 3.0 | 3.0 | 3.0 | 3.0 |
|  | Water-insoluble polymer (a1) | 1.3 | 1.3 | 1.3 | 1.3 | 1.3 | 1.3 | 1.3 | 1.3 | 1.3 | 1.3 |
| Component (B) (part(s)) | Resin particles (b1) | 1.8 | 1.8 | 1.8 | 1.8 | 1.8 | 1.8 | 1.8 | 1.8 | 1.8 |  |
|  | Resin particles (b2) |  |  |  |  |  |  |  |  |  | 1.8 |
| Component (X) (part(s)) | PPG400 |  |  |  | 1.0 |  |  |  |  |  |  |
|  | PPG700 |  |  |  |  | 1.0 |  |  |  |  |  |
|  | PPG1000 | 1.0 | 0.3 | 5.0 |  |  |  |  | 1.0 | 1.0 | 1.0 |
|  | PPG2000 |  |  |  |  |  | 1.0 |  |  |  |  |
|  | PPG3000 |  |  |  |  |  |  | 1.0 |  |  |  |
|  | PPG content*[2] | 1.0 | 0.3 | 5.0 | 1.0 | 1.0 | 0.95 | 0.5 | 1.0 | 1.0 | 1.0 |
|  | Average molecular weight | 1028 | 1028 | 1028 | 459 | 675 | 2083 | 3221 | 1028 | 1028 | 1028 |
| Component (C) (part(s)) | Glycerin | 5 | 5 | 5 | 5 | 5 | 5 | 5 | 5 | 5 | 5 |
|  | Propylene glycol | 20 | 20 | 20 | 20 | 20 | 20 | 20 | 20 | 20 | 20 |
|  | Diethylene glycol |  |  |  |  |  |  |  |  |  |  |
|  | Weighted mean value (/° C.) | 208 | 208 | 208 | 208 | 208 | 208 | 208 | 208 | 208 | 208 |
| Surfactant (part(s)) | "SURFYNOL 104" | 0.5 | 0.5 | 0.5 | 0.5 | 0.5 | 0.5 | 0.5 |  |  | 0.5 |
|  | "SURFYNOL 420" |  |  |  |  |  |  |  | 0.5 |  |  |
|  | "SURFYNOL 465" |  |  |  |  |  |  |  |  | 0.5 |  |
|  | "KF-354L" |  |  |  |  |  |  |  |  |  |  |
| Others | Ion-exchanged water*[1] | balance | balance | balance | balance | balance | balance | balance | balance | balance | balance |

TABLE 1-continued

|  |  |  |  |  |  |  |  |  |  |  |
|---|---|---|---|---|---|---|---|---|---|---|
| Mass ratio [component (B)/component (X)]*3 | | 1.8 | 6.0 | 0.4 | 1.8 | 1.8 | 1.9 | 3.6 | 1.8 | 1.8 | 1.8 |
| Recording medium | | 1 | 1 | 1 | 1 | 1 | 1 | 1 | 1 | 1 | 1 |
| Evaluation results | Ejection stability | 98 | 90 | 82 | 75 | 98 | 90 | 73 | 97 | 96 | 95 |
|  | Quick-drying fixing properties | A | A | A | A | A | A | A | B | B | B |
|  | Long-term fixing properties | A | A | A | A | A | A | A | A | B | B |
|  | Image uniformity | A | A | A | A | A | A | A | B | C | A |

| | | Examples |||||||||| 
|---|---|---|---|---|---|---|---|---|---|---|---|
| | | 11 | 12 | 13 | 14 | 15 | 16 | 17 | 18 | 19 | 20 |
| Component (A) (part(s)) | Pigment (PB15:3) | 3.0 | 3.0 | 3.0 | 3.0 | 3.0 | 3.0 | 3.0 | 3.0 | 3.0 | 3.0 |
| | Water-insoluble polymer (a1) | 1.3 | 1.3 | 1.3 | 1.3 | 1.3 | 1.3 | 1.3 | 1.3 | 1.3 | 1.3 |
| Component (B) (part(s)) | Resin particles (b1) | 1.8 | 1.8 | 1.8 | 1.8 | 1.8 | 1.8 | | 1.8 | | |
| | Resin particles (b2) | | | | | | | 1.8 | | 3.0 | 0.5 |
| Component (X) (part(s)) | PPG400 | | | | | | | | | | |
| | PPG700 | | | | | 1.0 | | | | | |
| | PPG1000 | 1.0 | 1.0 | 1.0 | 1.0 | | 1.0 | 1.0 | 1.0 | 0.1 | 1.5 |
| | PPG2000 | | | | | | | | | | |
| | PPG3000 | | | | | | | | | | |
| | PPG content*2 | 1.0 | 1.0 | 1.0 | 1.0 | 1.0 | 1.0 | 1.0 | 1.0 | 0.1 | 1.5 |
| | Average molecular weight | 1028 | 1028 | 1028 | 1028 | 675 | 1028 | 1028 | 1028 | 1028 | 1028 |
| Component (C) (part(s)) | Glycerin | 5 | 5 | 5 | 5 | 5 | 5 | 5 | 5 | 5 | 5 |
| | Propylene glycol | | 20 | 25 | 20 | 20 | 20 | 20 | | 20 | 20 |
| | Diethylene glycol | 20 | | | | | | | 20 | | |
| | Weighted mean value (/° C.) | 253 | 208 | 205 | 208 | 208 | 208 | 208 | 253 | 208 | 208 |
| Surfactant (part(s)) | "SURFYNOL 104" | 0.5 | | | 0.5 | 0.5 | | 0.5 | 0.5 | 0.5 | 0.5 |
| | "SURFYNOL 420" | | | | | | 0.5 | | | | |
| | "SURFYNOL 465" | | | | | | | | | | |
| | "KF-354L" | | 0.5 | | | | | | | | |
| Others | Ion-exchanged water*1 | balance | balance | balance | balance | balance | balance | balance | balance | balance | balance |
| Mass ratio [component (B)/component (X)]*3 | | 1.8 | 1.8 | 1.8 | 1.8 | 1.8 | 1.8 | 1.8 | 1.8 | 30.0 | 0.3 |
| Recording medium | | 1 | 1 | 1 | 2 | 2 | 2 | 2 | 2 | 1 | 1 |
| Evaluation results | Ejection stability | 98 | 96 | 95 | 98 | 98 | 97 | 97 | 98 | 80 | 98 |
| | Quick-drying fixing properties | C | A | C | B | B | B | B | C | A | B |
| | Long-term fixing properties | B | A | A | A | A | A | C | B | A | C |
| | Image uniformity | A | D | D | B | B | B | A | A | A | A |

Note
*1 Amount of ion-exchanged water as a balance on the basis of 100 parts by mass of whole components.
*2 Total content of PPG components having a polymerization degree of not less than 5 and not more than 45.
*3 Mass ratio [resin particles (B)/polypropylene glycol (X)]

TABLE 2

| | | Comparative Examples ||||
|---|---|---|---|---|---|
| | | 1 | 2 | 3 | 4 |
| Component (A) (part(s)) | Pigment (PB15:3) | 3.0 | 3.0 | 3.0 | 3.0 |
| | Water-insoluble polymer (a1) | 1.3 | 1.3 | 1.3 | 1.3 |
| Component (B) (part(s)) | Resin particles (b1) | 1.8 | | 1.8 | |
| | Water-soluble polymer (c1) | | 1.8 | | |
| Polyalkylene glycol components (part(s)) | PPG1000 | | | | 1.0 |
| | PEG1000 | 1.0 | | | |
| | PPG content*2 | 0.0 | 1.0 | 0.0 | 1.0 |
| | Average molecular weight | 976 | 1028 | — | 1028 |
| Component (C) (part(s)) | Glycerin | 5 | 5 | 5 | 5 |
| | Propylene glycol | 20 | 20 | 25 | 25 |
| | Weighted mean value (/° C.) | 208 | 208 | 205 | 205 |
| Surfactant | "SURFYNOL 104" | 0.5 | 0.5 | 0.5 | 0.5 |
| Others | Ion-exchanged water*1 | balance | balance | balance | balance |
| | Recording medium | 1 | 1 | 1 | 1 |

TABLE 2-continued

|  |  | Comparative Examples | | | |
|---|---|---|---|---|---|
|  |  | 1 | 2 | 3 | 4 |
| Evaluation results | Ejection stability | 50 | 93 | 65 | 98 |
|  | Quick-drying fixing properties | A | D | A | D |
|  | Long-term fixing properties | A | D | A | D |
|  | Image uniformity | A | A | A | A |

Note
[*1] Amount of ion-exchanged water as a balance on the basis of 100 parts by mass of whole components.
[*2] Total content of PPG components having a polymerization degree of not less than 5 and not more than 45.

From Tables 1 and 2, it was confirmed that the water-based inks obtained in the respective Examples were excellent in ejection stability as compared to the water-based inks obtained in the respective Comparative Examples. In addition, the water-based inks obtained in Examples exhibited a practical or higher level with respect to any of quick-drying fixing properties and long-term fixing properties when printing characters or images on a low-water absorbing recording medium, and therefore were excellent in both of these properties.

On the other hand, the water-based inks obtained in Comparative Examples 2 and 4 in which the inks included no resin particles according to the present invention were deteriorated in quick-drying fixing properties and long-term fixing properties, whereas the water-based ink obtained in Comparative Example 3 in which the ink included the resin particles but no polypropylene glycol exhibited similar quick-drying fixing properties and long-term fixing properties but was deteriorated in ejection stability as compared to those of the water-based inks obtained in the Examples. Furthermore, the water-based ink obtained in Comparative Example 1 in which the ink of Comparative Example 3 further included the polyethylene glycol was not improved in ejection stability. As described above, it was confirmed that the water-based inks obtained in the Examples were excellent in quick-drying fixing properties and long-term fixing properties while maintaining high ejection stability.

The invention claimed is:

1. An ink-jet printing method of printing characters or images on a recording medium using a water-based ink for ink-jet printing, said method comprising the steps of:
providing a recording medium that has a water absorption of not more than 10 g/m$^2$ and not less than 0 g/m$^2$ as measured in a pure water contact time of 100 milliseconds;
providing a water-based ink which comprises a pigment (A), resin particles (B), a polypropylene glycol (X), and water;
wherein the resin particles (B) are produced by an emulsion polymerization method by subjecting an ethylenically unsaturated monomer to emulsion polymerization to form the resin particles (B);
wherein, in said water-based ink, a total content of polypropylene glycol components having a polymerization degree of from 5 to 45 contained in the polypropylene glycol (X) is from 0.2% by mass to 6% by mass; and
utilizing said water-based ink to print characters or images on said recording medium.

2. The ink-jet printing method according to claim 1, wherein an average molecular weight of the polypropylene glycol (X) is not less than 250 and not more than 3,500.

3. The ink-jet printing method according to claim 1, wherein a mass ratio of the resin particles (B) to the polypropylene glycol (X) [resin particles (B)/polypropylene glycol (X)] is not less than 0.2 and not more than 40.

4. The ink-jet printing method according to claim 1, wherein a content of the resin particles (B) in the water-based ink is not less than 0.5% by mass and not more than 5.0% by mass.

5. The ink-jet printing method according to claim 1, wherein the water-based ink further comprises an acetylene glycol-based surfactant.

6. The ink-jet printing method according to claim 5, wherein the acetylene glycol-based surfactant is a compound having an average molar number of addition of ethyleneoxide of not more than 5 moles.

7. The ink-jet printing method according to claim 5, wherein the content of the acetylene glycol-based surfactant in the water-based ink is not less than 0.1% by mass and not more than 2% by mass.

8. The ink-jet printing method according to claim 1, wherein the resin particles (B) are acrylic resin particles.

9. The ink-jet printing method according to claim 1, wherein a weight-average molecular weight of the resin particles (B) is not less than 70,000.

10. The ink-jet printing method according to claim 9, wherein a weight-average molecular weight of the resin particles (B) is not more than 1,200,000.

11. The ink-jet printing method according to claim 1, wherein the pigment (A) that is contained in the water-based ink is in the form of pigment-containing water-insoluble polymer (a) particles.

12. The ink-jet printing method according to claim 11, wherein the water-insoluble polymer (a) comprises a constitutional unit derived from (a-1) an ionic monomer and a constitutional unit derived from (a-2) a hydrophobic monomer.

13. The ink-jet printing method according to claim 11, wherein a total content of the pigment (A) and the water-insoluble polymer (a) in the water-based ink is not less than 2.0% by mass and not more than 17.0% by mass.

14. The ink-jet printing method according to claim 1, wherein the water-based ink further comprises at least one organic solvent (C) other than the polypropylene glycol (X), the organic solvent (C) having a boiling point of not less than 90° C., in which a weighted mean value of the boiling point of the organic solvent (C) which is weighted by contents (% by mass) of respective organic solvents in the organic solvent (C) is not higher than 260° C.

15. The ink-jet printing method according to claim 14, wherein the organic solvent (C) is a combination of two or more kinds of polyhydric alcohols, a combination of two or more kinds of polyhydric alcohol alkyl ethers or a combination of at least one polyhydric alcohol and at least one polyhydric alcohol alkyl ether.

16. The ink-jet printing method according to claim 14, wherein the content of the organic solvent (C) in the water-based ink is not less than 5.0% by mass and not more than 60.0% by mass.

17. The ink-jet printing method according to claim 1, wherein the content of water in the water-based ink is not less than 20% by mass and not more than 80% by mass.

* * * * *